US010984509B2

(12) United States Patent
Watanabe et al.

(10) Patent No.: US 10,984,509 B2
(45) Date of Patent: Apr. 20, 2021

(54) IMAGE PROCESSING APPARATUS, IMAGING DEVICE, MOVING BODY DEVICE CONTROL SYSTEM, IMAGE INFORMATION PROCESSING METHOD, AND PROGRAM PRODUCT

(71) Applicant: Ricoh Company, Ltd., Tokyo (JP)

(72) Inventors: Genki Watanabe, Tokyo (JP); Hiroyoshi Sekiguchi, Kanagawa (JP); Soichiro Yokota, Kanagawa (JP); Seiya Amano, Kanagawa (JP); Yuu Yamada, Kanagawa (JP); Keito Sawada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 162 days.

(21) Appl. No.: 16/044,983

(22) Filed: Jul. 25, 2018

(65) Prior Publication Data

US 2018/0330481 A1 Nov. 15, 2018

Related U.S. Application Data

(63) Continuation of application No. PCT/JP2017/000039, filed on Jan. 4, 2017.

(30) Foreign Application Priority Data

Jan. 28, 2016 (JP) ............................. JP2016-014595

(51) Int. Cl.
*G06T 5/00* (2006.01)
*G06T 7/00* (2017.01)
(Continued)

(52) U.S. Cl.
CPC ............... *G06T 5/006* (2013.01); *G06T 7/00* (2013.01); *G06T 7/20* (2013.01); *G06T 7/248* (2017.01);
(Continued)

(58) Field of Classification Search
None
See application file for complete search history.

(56) References Cited

U.S. PATENT DOCUMENTS 5,764,803 A * 6/1998 Jacquin ............... H04N 19/503
375/E7.081
8,233,031 B2 7/2012 Saito
(Continued)

FOREIGN PATENT DOCUMENTS

EP 2921992 3/2015
JP 2008-064628 3/2008
(Continued)

OTHER PUBLICATIONS

Haberjahn, Mathias, and Marek Junghans. "Vehicle environment detection by a combined low and mid level fusion of a laser scanner and stereo vision." 2011 14th International IEEE Conference on Intelligent Transportation Systems (ITSC). IEEE, 2011. (Year: 2011).*

(Continued)

*Primary Examiner* — Michelle M Entezari
*Assistant Examiner* — Michelle M Entezari Hausmann
(74) *Attorney, Agent, or Firm* — Xsensus LLP

(57) ABSTRACT

Disclosed is an image processing apparatus that includes one or more processors; and a memory storing instructions, which when executed by the one or more processors, cause the one or more processors to: generate distribution data indicating a frequency distribution of horizontal distance values of a range image based on the range image having pixel values according to distance of an object in a plurality of captured images; detect an object based on the distribution data with respect to a range image; predict a predicted position of the object in a current frame based on the distribution data with respect to range images of a plurality of previous frames; and integrate a plurality of objects (Continued)

detected by the detector based on the predicted position to track an integrated object in subsequent frames.

15 Claims, 40 Drawing Sheets

(51) Int. Cl.
| G06T 7/20 | (2017.01) |
| G06T 7/246 | (2017.01) |
| G06T 7/285 | (2017.01) |
| G06T 7/80 | (2017.01) |
| G06T 7/593 | (2017.01) |
| G06T 3/40 | (2006.01) |
| G08G 1/16 | (2006.01) |
| H04N 13/239 | (2018.01) |
| H04N 13/00 | (2018.01) |

(52) U.S. Cl.
CPC .............. *G06T 7/285* (2017.01); *G06T 7/80* (2017.01); *G08G 1/16* (2013.01); *G08G 1/166* (2013.01); *B60R 2300/105* (2013.01); *B60R 2300/107* (2013.01); *G06T 3/40* (2013.01); *G06T 7/593* (2017.01); *G06T 2207/10021* (2013.01); *G06T 2207/10028* (2013.01); *G06T 2207/20021* (2013.01); *G06T 2207/20092* (2013.01); *G06T 2207/30252* (2013.01); *H04N 13/239* (2018.05); *H04N 2013/0081* (2013.01)

(56) References Cited

U.S. PATENT DOCUMENTS

| 8,494,301 | B2* | 7/2013 | Adams, Jr. ............ H04N 5/2356 |
| | | | 382/255 |
| 8,570,334 | B2 | 10/2013 | Sekiguchi et al. |
| 8,605,153 | B2 | 12/2013 | Sasaki et al. |
| 8,773,508 | B2* | 7/2014 | Daniel ...................... G06T 7/55 |
| | | | 348/46 |
| 9,097,800 | B1* | 8/2015 | Zhu ...................... G01S 7/4802 |
| 9,123,129 | B2* | 9/2015 | Bobbitt .............. G06K 9/00771 |
| 9,378,554 | B2* | 6/2016 | Chang ...................... G06T 7/33 |
| 9,607,400 | B2 | 3/2017 | Guan |
| 9,637,118 | B2 | 5/2017 | Yokota et al. |
| 9,726,604 | B2 | 8/2017 | Sekiguchi et al. |
| 9,792,491 | B1* | 10/2017 | Ramaswamy ..... G06K 9/00255 |
| 9,819,927 | B2 | 11/2017 | Takahashi et al. |
| 10,395,144 | B2* | 8/2019 | Zeng ................... G05D 1/0088 |
| 10,805,514 | B2* | 10/2020 | Lee .......................... G06T 7/55 |
| 2003/0053692 | A1* | 3/2003 | Hong ...................... H04N 19/23 |
| | | | 382/171 |
| 2005/0031165 | A1* | 2/2005 | Olson ...................... G06T 7/20 |
| | | | 382/103 |
| 2005/0117778 | A1* | 6/2005 | Crabtree ............ G06K 9/00771 |
| | | | 382/103 |
| 2007/0124335 | A1* | 5/2007 | Park .......................... G06T 7/00 |
| 2008/0170118 | A1* | 7/2008 | Albertson .............. A61H 3/061 |
| | | | 348/46 |
| 2009/0309961 | A1* | 12/2009 | Miyashita .............. G06K 9/6251 |
| | | | 348/65 |
| 2010/0191391 | A1* | 7/2010 | Zeng ........................ G01S 13/87 |
| | | | 701/1 |
| 2010/0197399 | A1* | 8/2010 | Geiss ..................... A63F 13/213 |
| | | | 463/32 |
| 2010/0271257 | A1* | 10/2010 | Hirogari ............... G01S 13/726 |
| | | | 342/107 |
| 2011/0222727 | A1* | 9/2011 | Sharma ................... G06T 7/246 |
| | | | 382/103 |
| 2012/0242835 | A1 | 9/2012 | Li et al. |
| 2012/0268567 | A1* | 10/2012 | Nakazato .............. G01B 11/03 |
| | | | 348/46 |
| 2013/0242285 | A1* | 9/2013 | Zeng ........................ G01S 17/66 |
| | | | 356/28 |
| 2013/0332061 | A1* | 12/2013 | Dowdall ............. B60W 30/095 |
| | | | 701/301 |
| 2014/0003671 | A1* | 1/2014 | Matsubara ............. G08G 1/166 |
| | | | 382/104 |
| 2014/0085545 | A1 | 3/2014 | Tu et al. |
| 2014/0184751 | A1* | 7/2014 | Liou .................... H04N 13/246 |
| | | | 348/47 |
| 2014/0254881 | A1* | 9/2014 | Jin .......................... G06T 7/215 |
| | | | 382/107 |
| 2015/0049195 | A1 | 2/2015 | Ishigaki et al. |
| 2015/0294160 | A1 | 10/2015 | Takahashi et al. |
| 2015/0332103 | A1 | 11/2015 | Yokota et al. |
| 2016/0014406 | A1 | 1/2016 | Takahashi et al. |
| 2016/0019429 | A1 | 1/2016 | Ishigaki et al. |
| 2016/0019683 | A1* | 1/2016 | You .......................... G06T 7/74 |
| | | | 382/103 |
| 2016/0092739 | A1* | 3/2016 | Oami ...................... G06T 7/292 |
| | | | 348/159 |
| 2016/0219208 | A1* | 7/2016 | Horesh ............. H04N 5/23219 |
| 2016/0277397 | A1 | 9/2016 | Watanabe |
| 2016/0301912 | A1 | 10/2016 | Saitoh et al. |
| 2017/0011520 | A1* | 1/2017 | Mathew ............... G06K 9/6232 |
| 2018/0047173 | A1* | 2/2018 | Wang ...................... G06T 7/136 |
| 2018/0342068 | A1* | 11/2018 | Hasejima ................ G08G 1/16 |

FOREIGN PATENT DOCUMENTS

| JP | 2011-113330 | 6/2011 |
| JP | 4856612 | 1/2012 |
| JP | 2014-115978 | 6/2014 |
| JP | 2015-195018 | 11/2015 |
| JP | 2015-207281 | 11/2015 |
| WO | WO2012/029878 | 3/2012 |

OTHER PUBLICATIONS

Kim, Du Yong, and Moongu Jeon. "Data fusion of radar and image measurements for multi-object tracking via Kalman filtering." Information Sciences 278 (2014): 641-652. (Year: 2014).*

Jokinen, Olli. "Building 3-D city models from multiple unregistered profile maps." Proceedings. International Conference on Recent Advances in 3-D Digital Imaging and Modeling (Cat. No. 97TB100134). IEEE, 1997. (Year: 1997).*

Ess, Andreas, Bastian Leibe, and Luc Van Gool. "Depth and appearance for mobile scene analysis." 2007 IEEE 11th international conference on computer vision. IEEE, 2007. (Year: 2007).*

English Abstract for JP 2010113562 A Chin, Akira (Year: 2010).*

International Search Report dated Feb. 14, 2017 in PCT/JP2017/000039 Filed on Jan. 4, 2017(with English translation).

T. Miyasaka et al., "Ko Kaizodo Laser Radar o Mochiita Soko Kankyo ni Okeru Idobutsu no Tsuiseki to Shikibetsu", Eizo Joho Industrial, vol. 43, No. 2, pp. 61-69 (2011) (with Machine Translation).

R. Okada et al., "Tracking a Person with 3-D Motion by Integrating Optical Flow and Depth", IEICE Technical Report. vol. 98, No. 528, pp. 9-16 (1999) (with English Abstract).

Written Opinion dated Feb. 14, 2017 in PCT/JP2017/000039 Filed on Jan. 4, 2017.

Extended European Search Report dated Nov. 6, 2018 in Patent Application No. 17743873.6, 11 pages.

Wang, B. et al. "Multiple Obstacle Detection and Tracking using Stereo Vision: Application and Analysis" 2014 13th International Conference on Control, Automation, Robotics and Vision, IEEE, XP032749347, 2014, pp. 1074-1079.

Song, X. et al. "Robust Vehicle Blob Tracking with Split/Merge Handling" Multimodal Technologies for Perception of Humans, Lecture Notes in Computer Science, XP019076822, 2006, pp. 216-222.

* cited by examiner

CAPTURED IMAGE

V MAP

FREQUENCY U MAP

HEIGHT U MAP

FIG.16

| OBJECT TYPE | WIDTH | HEIGHT | DEPTH | UNIT (mm) |
|---|---|---|---|---|
| MOTORBIKE, BICYCLE | <1100 | <2500 | >1000 | |
| PEDESTRIAN | <1100 | <2500 | <=1000 | |
| COMPACT CAR | <1700 | <1700 | <10000 | |
| STANDARD SIZE CAR | <1700 | <2500 | <10000 | |
| TRUCK | <3500 | <3500 | <15000 | |
| OTHERS | OBJECT NOT APPLICABLE TO ABOVE SIZE | | | |

FIG.17

| DATA CATEGORY | DATA NAME | DETAIL |
|---|---|---|
| OBJECT DATA | POSITION | UPPER LEFT COORDINATES (x, y) IN PARALLAX IMAGE |
| | SIZE | SIZE (w, h) OF OBJECT IN PARALLAX IMAGE |
| | DISTANCE | DISTANCE TO SUBJECT (m) |
| | RELATIVE VELOCITY | RELATIVE VELOCITY PER FRAME (HORIZONTAL X (m/FRAME), DEPTH Z (m/FRAME)) |
| | ACTUAL POSITION | HORIZONTAL X (m), DEPTH Z (m) |
| | ACTUAL SIZE | LEFT END (m), RIGHT END (m), HEIGHT (m) |
| OBJECT PREDICTION DATA | POSITION | UPPER LEFT COORDINATES (x, y) IN PARALLAX IMAGE |
| | SIZE | SIZE (w, h) OF OBJECT IN PARALLAX IMAGE |
| | DISTANCE | DISTANCE TO SUBJECT (m) |
| OBJECT FEATURE AMOUNT | HISTOGRAM PEAK POSITION | PEAK POSITION: UP TO 4 |
| | DISTANCE BETWEEN PEAKS | ACTUAL DISTANCE BETWEEN PEAKS (m) |
| TRACKING DATA | IMAGE | IMAGE OF REGION INCLUDING OBJECT IN PARALLAX IMAGE |
| | NUMBER OF CONTINUOUS DETECTION FRAMES | NUMBER OF FRAMES CONTINUOUSLY DETECTED |
| | NUMBER OF CONTINUOUS UNDETECTED FRAMES | NUMBER OF FRAMES CONTINUOUSLY UNDETECTED |
| | TRACKING STATUS | TRACKING STATUS |
| | ESTIMATED TIMES | NUMBER OF TIMES ESTIMATED TRACKING STATUS IS MAINTAINED |

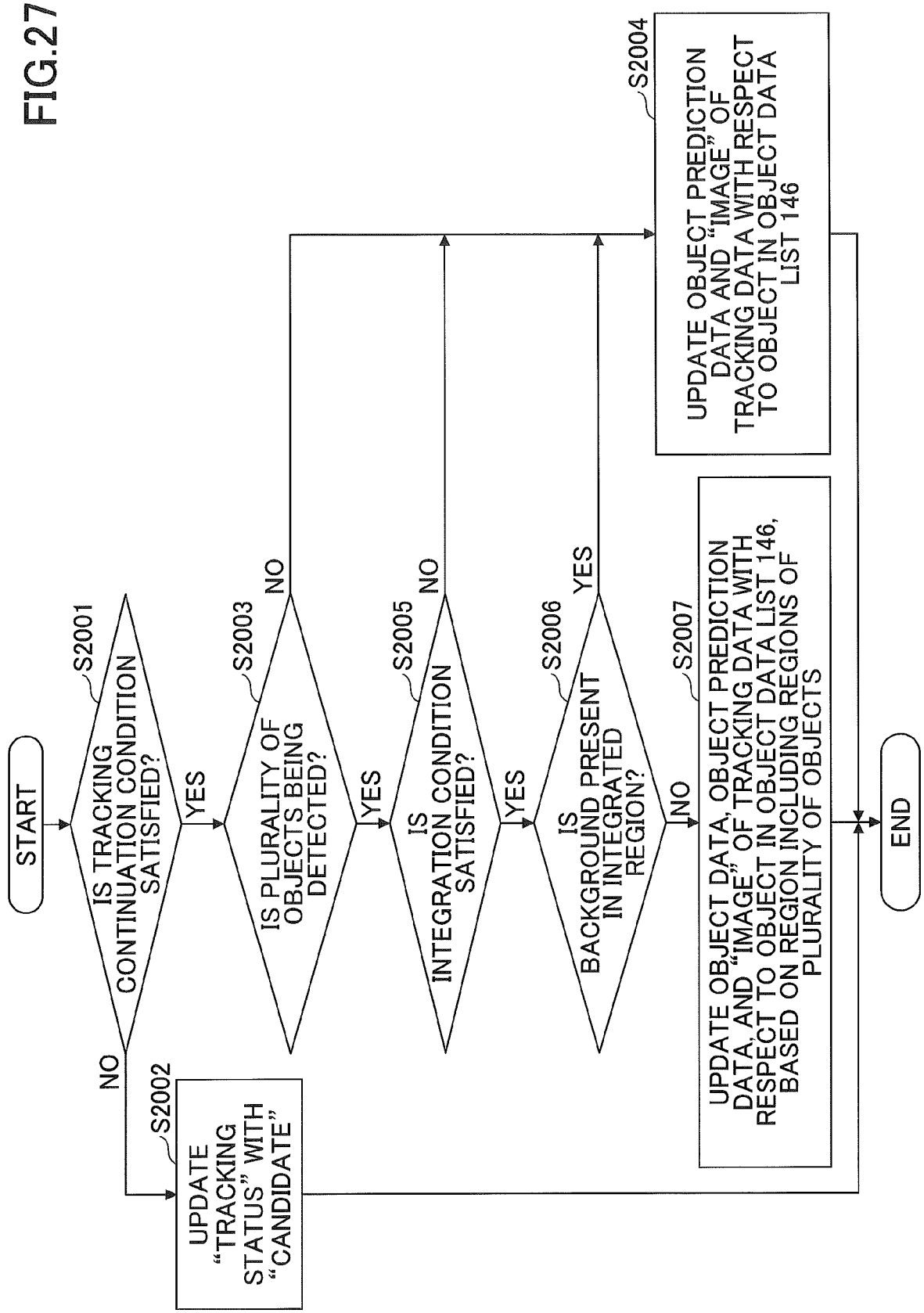

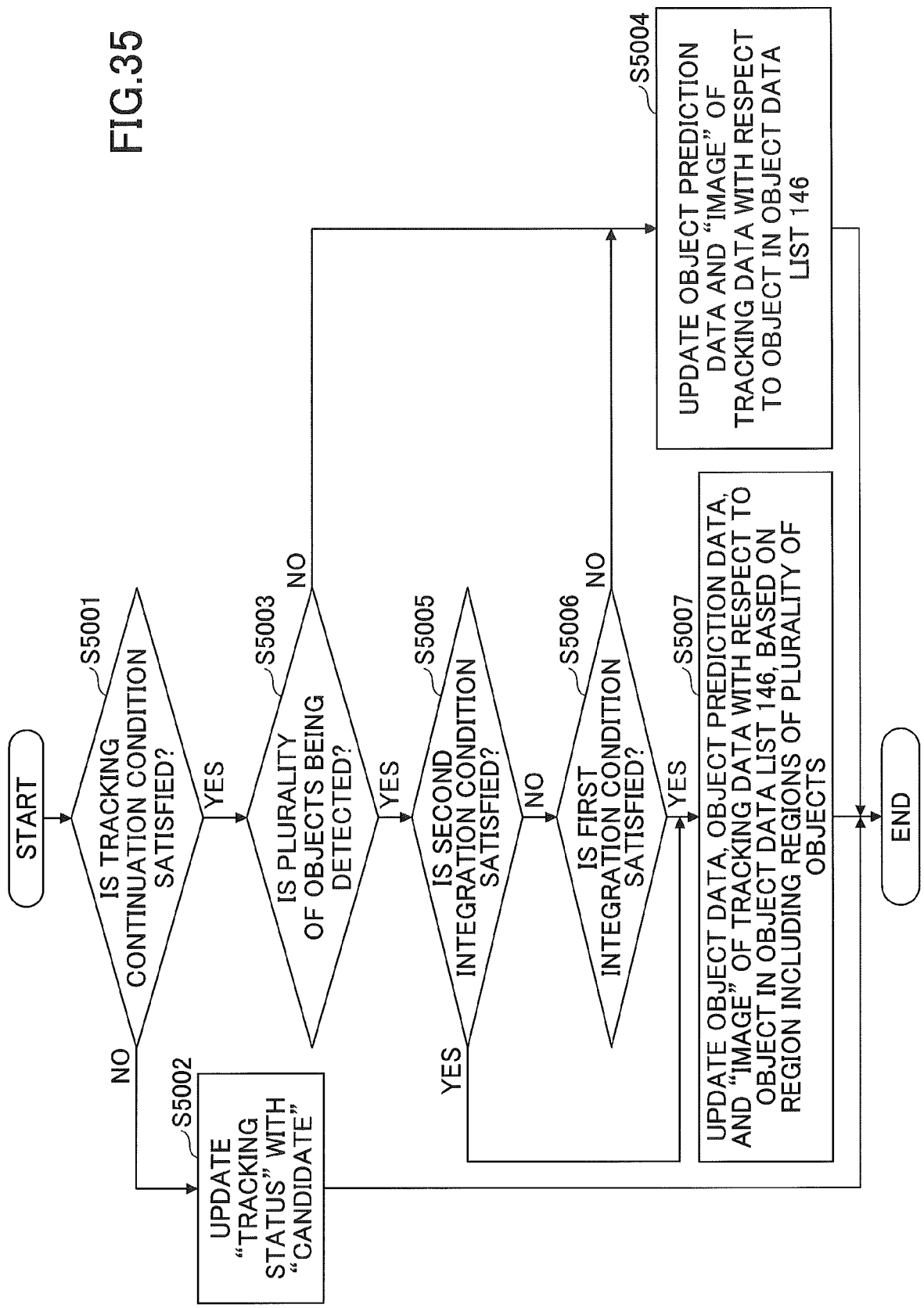

IMAGE PROCESSING APPARATUS, IMAGING DEVICE, MOVING BODY DEVICE CONTROL SYSTEM, IMAGE INFORMATION PROCESSING METHOD, AND PROGRAM PRODUCT

CROSS-REFERENCE TO RELATED APPLICATIONS

The present application is a continuation application of International Application No. PCT/JP2017/000039, filed on Jan. 4, 2017, which claims priority to Japanese Patent Application No. 2016-014595, filed on Jan. 28, 2016. The contents of these applications are incorporated herein by reference in their entirety.

BACKGROUND OF THE INVENTION

1. Field of the Invention

The disclosures discussed herein relate to an image processing apparatus, an imaging device, a moving body device control system, an image information processing method, and a program product.

2. Description of the Related Art

In vehicle safety, automobile body structures and the like have been developed from the perspectives of pedestrian and passenger protection against collision with pedestrians and other automobiles. Recent advances in information processing and image processing technologies have led to the development of high rate detection techniques for detecting people, automobiles, etc. Automobiles applied with these technologies, which automatically apply brakes before collision in order to prevent collision, are already on sale.

In order to apply brakes automatically, measuring the distance between an automobile and an object such as a person, another automobile, etc., is mandatory; hence, measurement using images of stereo cameras has been put into practical use.

In such measurement using images obtained by stereo cameras, a tracking technique is known in the related art. This tracking technique detects an object such as a preceding vehicle located ahead of a reference vehicle in a certain frame, and subsequently tracks the object in the subsequent frames, (e.g., see Patent Document 1).

This tracking technique reveals the movements vector of an object so as to correctly assess the danger of the object. For example, suppose a case where there are two similar objects located 20 m ahead of a reference vehicle, where a first object is traveling with a relative velocity of 0 km/h (i.e., moving at the same velocity as the reference vehicle) and a second object is traveling with a relative velocity of −50 km/h (approaching the reference vehicle). It is important to correctly assess the danger of these objects because even though the two similar objects are travelling 20 m ahead of the reference vehicle, there is a significant difference in the danger between the two objects.

RELATED-ART DOCUMENT

Patent Document

[PTL 1] Japanese Patent No. 4856612

However, in the related art technology, when the number of pixels having parallax values is small in the parallax image or the like, the region of one object tracked with the parallax image of the previous frame may be undesirably divided, and the divided regions may be detected as a result. FIGS. 26A and 26B are diagrams illustrating an example in the case where a region of one object of the related art technology is divided and detected. In the example of FIG. 26A, a region of one object is divided into left and right, and detected as regions 552$a$ and 553$a$ of a plurality of objects. In the example of FIG. 23B, a region of an object is divided into separate regions having inconsistent sizes, which are detected as respective regions 552$b$ and 553$b$ of a plurality of objects. Accordingly, despite the fact that there is only one object originally, the object may be detected as if there are two objects.

SUMMARY OF THE INVENTION

According to an aspect of the disclosure, a transmission control system includes a transmission controller configured to control transmission of content data including image data and sound data in a session for transmitting the content data between a plurality of communications terminals, the communications terminals including a first communications terminal, a second communications terminal and a third communications terminal.

BRIEF DESCRIPTION OF THE DRAWINGS

Other objects and further features of embodiments will be apparent from the following detailed description when read in conjunction with the accompanying drawings, in which:

FIG. 16 is a diagram illustrating an example of table data for classifying object types;

FIG. 17 is a diagram illustrating an example of data items of an object data list;

FIG. 27 is a flowchart illustrating an example of a tracking process, according to a second embodiment;

FIG. 35 is a flowchart illustrating an example of a tracking process according to a fifth embodiment.

DESCRIPTION OF THE EMBODIMENTS

The following illustrates a moving body device control system having an image processing apparatus according to an embodiment.

First Embodiment

Configuration of In-Vehicle Device Control System

Figure 1:
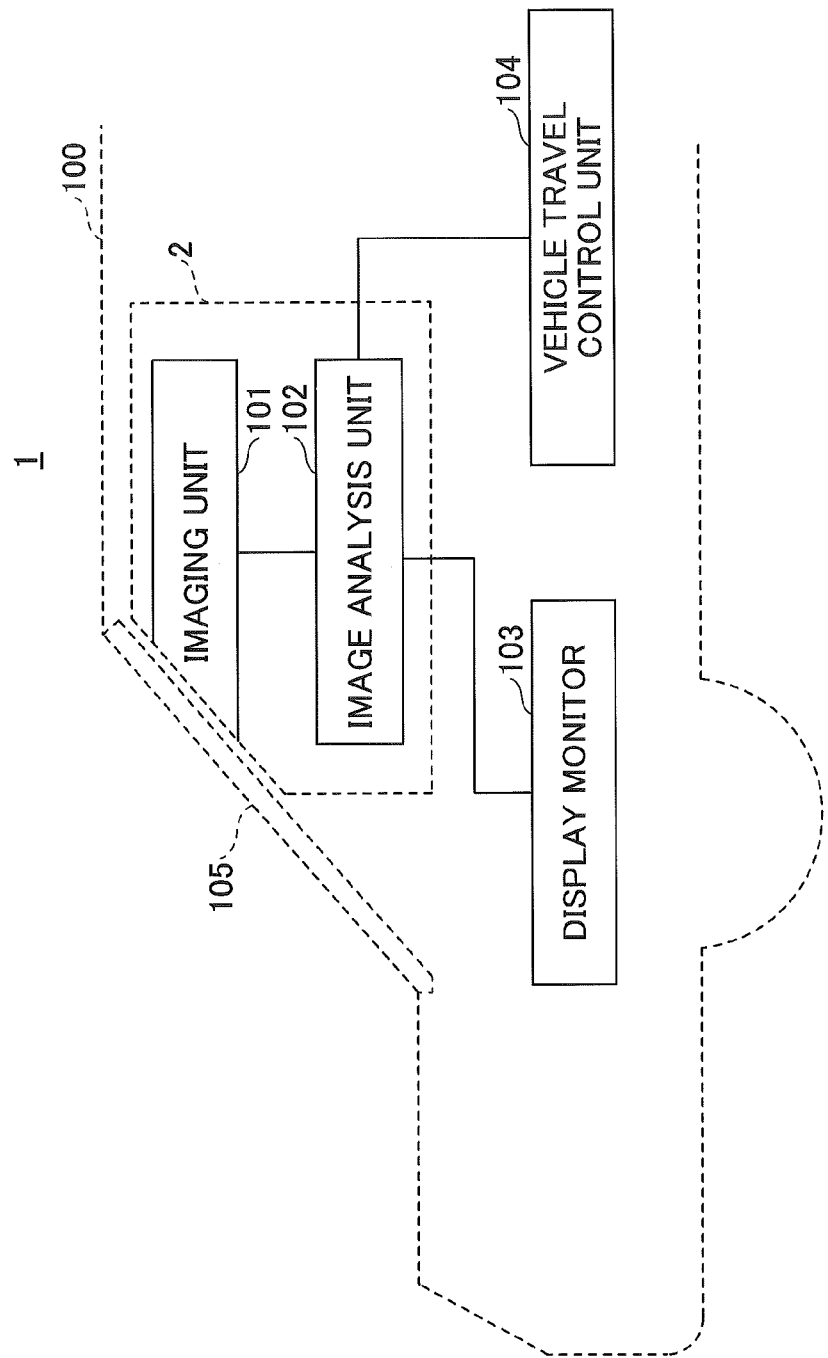
FIG. 1 is a schematic diagram illustrating a configuration of an in-vehicle device control system, according to an embodiment.

FIG. 1 is a diagram illustrating a configuration of an in-vehicle device control system acting as a moving body device control system, according to an embodiment of the present invention.

The in-vehicle device control system 1 is installed in a reference vehicle 100 such as an automobile that is a moving body, and includes an imaging unit 101, an image analysis unit 102, a display monitor 103, and a vehicle travel control unit 104. The imaging unit 101 detects and tracks an object in front of the reference vehicle from multiple captured image data (frames) each having an image of a forward region in a reference vehicle traveling direction that is an image of a moving body in front of the reference vehicle (an imaging region), and controls the moving body and various in-vehicle devices using the tracking results. The control of the moving body includes, for example, transmission of alert signs, control of a steering wheel of the reference vehicle 100 (reference moving body), or braking of the reference vehicle 100 (the reference moving body).

For example, the imaging unit 101 is disposed in the vicinity of a rear-view (not illustrated) of a windshield 105 of the reference vehicle 100. Various data such as captured image data obtained by the imaging unit 101 are input into the image analysis unit 102 acting as an image processing unit.

The image analysis unit 102 analyzes data transmitted from the imaging unit 101 to detect a relative height (positional information) at each point on a traveling road surface ahead of the reference vehicle with respect to a road surface portion (a road surface portion directly beneath the reference vehicle) on which the reference vehicle 100 is moving, to obtain a three-dimensional shape of the moving road surface ahead of the reference vehicle. Further, the image analysis unit 102 recognizes recognition objects such as other vehicles ahead of the reference vehicle, pedestrians, various obstacles, etc.

The analysis results of the image analysis unit 102 are sent to the display monitor 103 and the vehicle travel control unit 104. The display monitor 103 displays captured image data obtained by the imaging unit 101 and analysis results. Note that the display monitor 103 is optionally provided. The vehicle travel control unit 104 may, for example, send an alert sign to a driver of the reference vehicle 100 or perform travel support control such as control of the steering wheel and braking of the reference vehicle, based on the recognition results of the recognition object obtained by the image analysis unit 102 such as another vehicle, pedestrian, and various obstacles in front of the vehicle.

Configurations of Imaging Unit 101 and Image Analysis Unit 102

Figure 2:
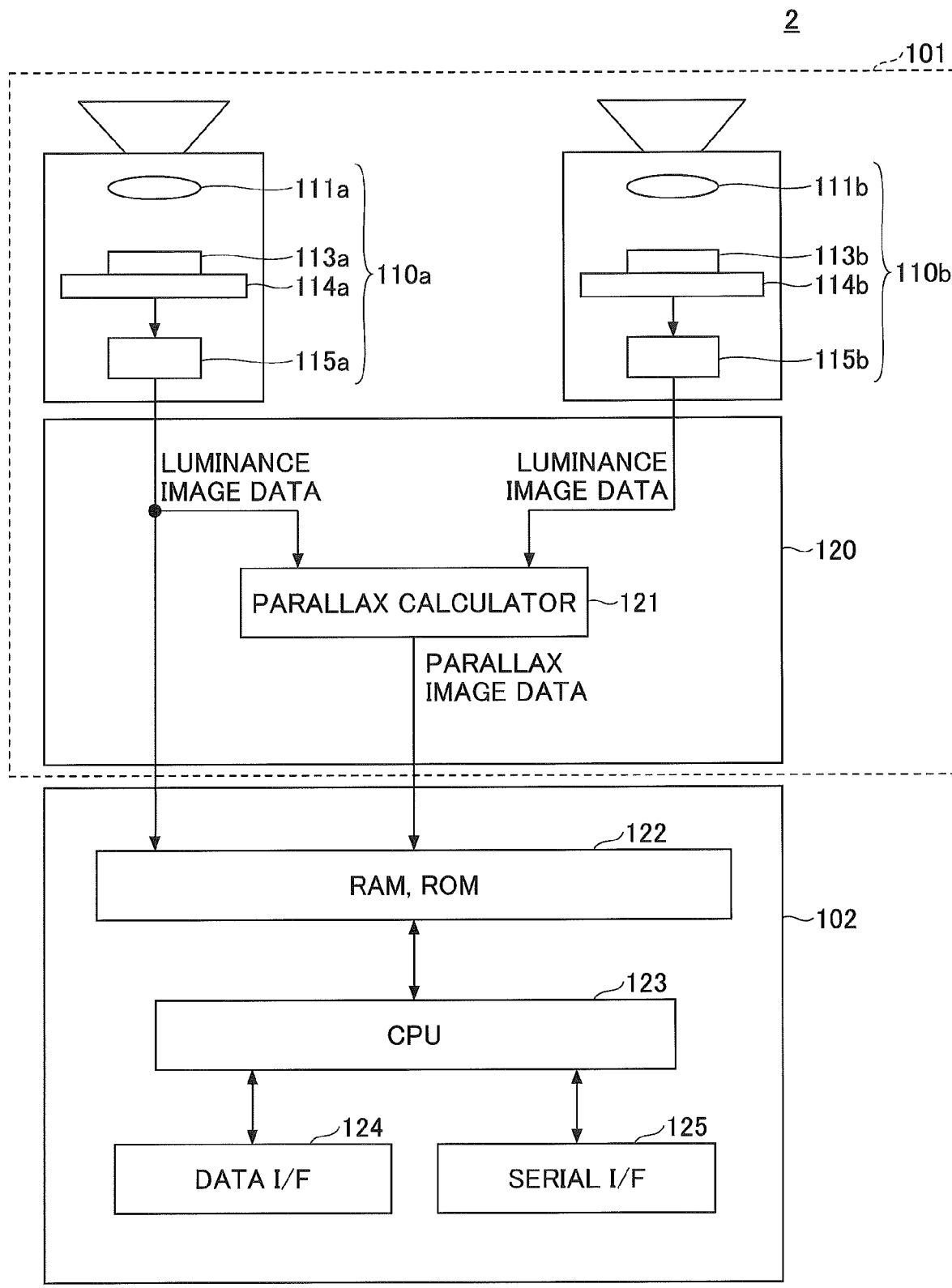
FIG. 2 is a schematic diagram illustrating configurations of an imaging unit and an image analysis unit, according to an embodiment.

FIG. 2 is a diagram illustrating configurations of the imaging unit 101 and the image analysis unit 102 according to an embodiment.

The imaging unit 101 includes a stereo camera having two imaging units 110a and 110b as imaging tools. The two imaging units 110a and 110b are the same components. The imaging units 110a and 110b include imaging lenses 111a and 111b, sensor substrates 114a and 114b including image sensors 113a and 113b having two-dimensionally arranged light receiving elements, and signal processors 115a and 115b configured to generate and output captured image data obtained by converting analog electric signals output from the sensor substrates 114a and 114b (electric signals corresponding to amounts of light received by respective light receiving elements on the image sensors 113a and 113b) into digital electric signals. The imaging unit 101 outputs luminance image data and parallax image data.

In addition, each of the imaging units 110a and 110b includes a process hardware unit 120 including a Field-Programmable Gate Array (FPGA) or the like. In order to obtain parallax images from the luminance image data output from the imaging units 110a and 110b, the process hardware unit 120 includes a parallax calculator 121 as a parallax image information generating tool to calculate a parallax value of a corresponding image portion between the respective captured images captured by the imaging units 110a and 110b.

The parallax value referred to here is a value obtained by taking one of the captured images captured by the imaging units 110a and 110b as a reference image and the other one as a comparison image, and calculating a positional deviation corresponding to a same point within the imaging region of an image portion on the comparison image with respect to an image portion on the reference image, as a parallax value of the image portion. By utilizing the principle of triangulation, a distance to the same point within an imaging region corresponding to the image portion may be calculated based on the parallax value of the image portion.

Figure 3:
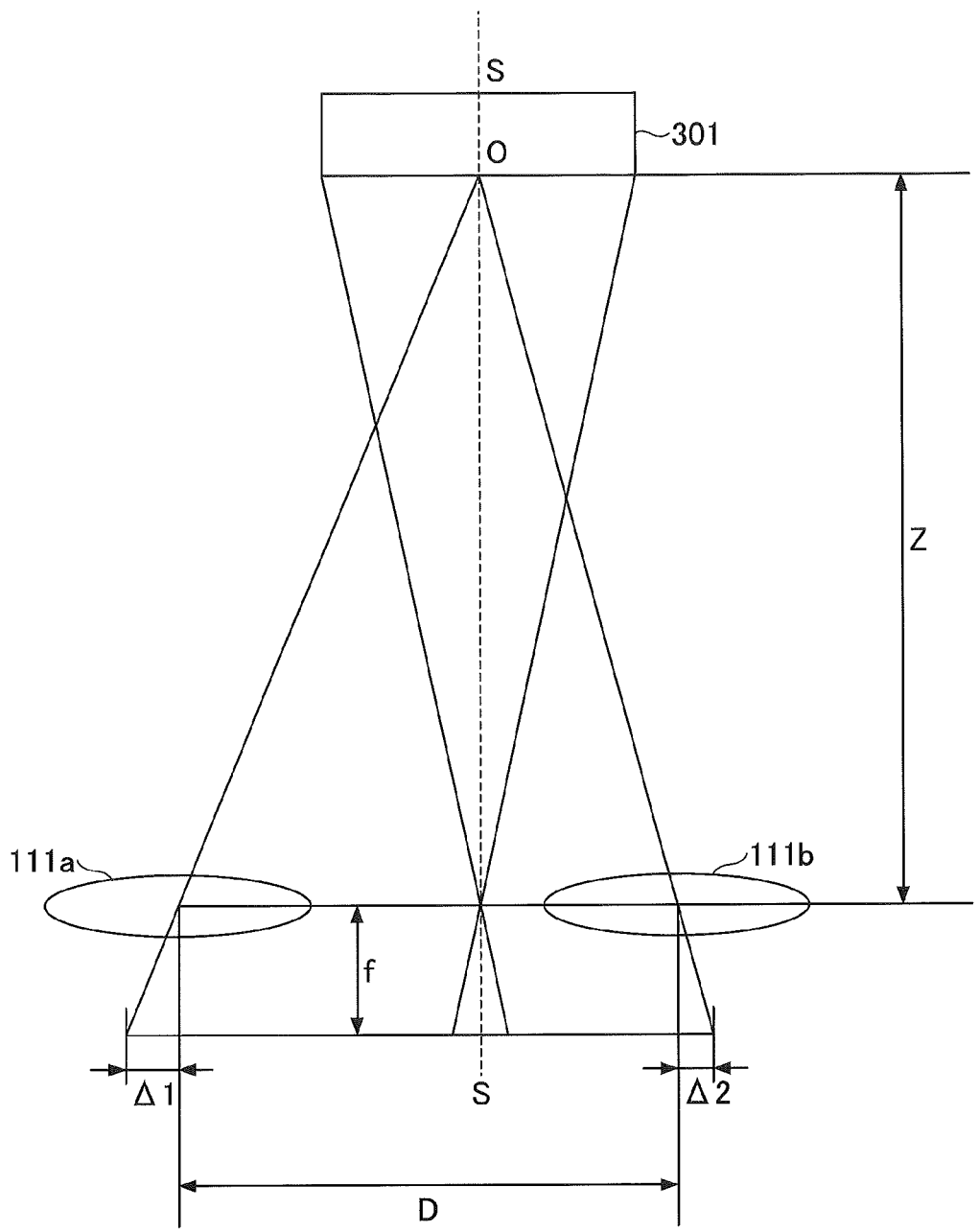
FIG. 3 is a diagram illustrating the principle of calculating a distance from a parallax value by utilizing the principle of triangulation.

FIG. 3 is a diagram illustrating the principle of calculating a distance based on the parallax value by a theory of triangulation. In FIG. 3, f is a focal distance of each of the imaging lenses 111a and 111b, and D is a distance between optical axes. Further, Z is a distance (a distance in a direction parallel to the optical axis) from the imaging lenses 111a and 111b to the subject 301. In FIG. 3, image forming positions of a left hand side image and a right hand image with respect to a certain point "O" on a subject 301 have respective distances Δ1 and Δ2 from the centers of the formed images. The parallax value d in this case may be defined as d=Δ1+Δ2.

The following description is given by referring back to FIG. 2. The image analysis unit 102 is composed of an image processing board or the like, and includes a storage unit 122 composed of a RAM, a ROM or the like configured to store the luminance image data and the parallax image data output from the imaging unit 101, a central processing unit (CPU) 123 configured to execute a computer program for performing parallax calculation control and the like, a data interface (I/F) 124, and a serial I/F 125.

The FPGA constituting the process hardware unit 120 executes a process requiring real-time processing on image data, for example, gamma correction, distortion correction (parallelization of left and right captured images), and parallax calculation by block matching to generate parallax images and writes the generated information in the RAM of the image analysis unit 102. The CPU of the image analysis unit 102 is responsible for control of an image sensor controller of each of the imaging units 110A and 110B and overall control of the image processing board. The CPU of the image analysis unit 102 also loads a program for executing a process of detecting a three-dimensional shape of a road surface, a process of detecting various objects (objects) such as guardrails, and the like from the ROM, executes various kinds of processes by inputting the luminance image data and the parallax image data stored in the RAM, and outputs the process results to the outside via the data I/F 124 and the serial I/F 125. Upon execution of such processes, vehicle operation information, such as vehicle velocity and acceleration (mainly acceleration in a longitudinal direction of the vehicle), steering angle, and yaw rate of the reference vehicle 100, is input via the data I/F 124, and used as parameters of various kinds of processes. The data output to the outside may be used as input data for controlling the various devices of the reference vehicle 100 (brake control, vehicle velocity control, warning control, etc.).

Note that the imaging unit 101 and the image analysis unit 102 may be configured as an imaging device 2, which is an integrated device.

Object Detection Process

Figure 4:
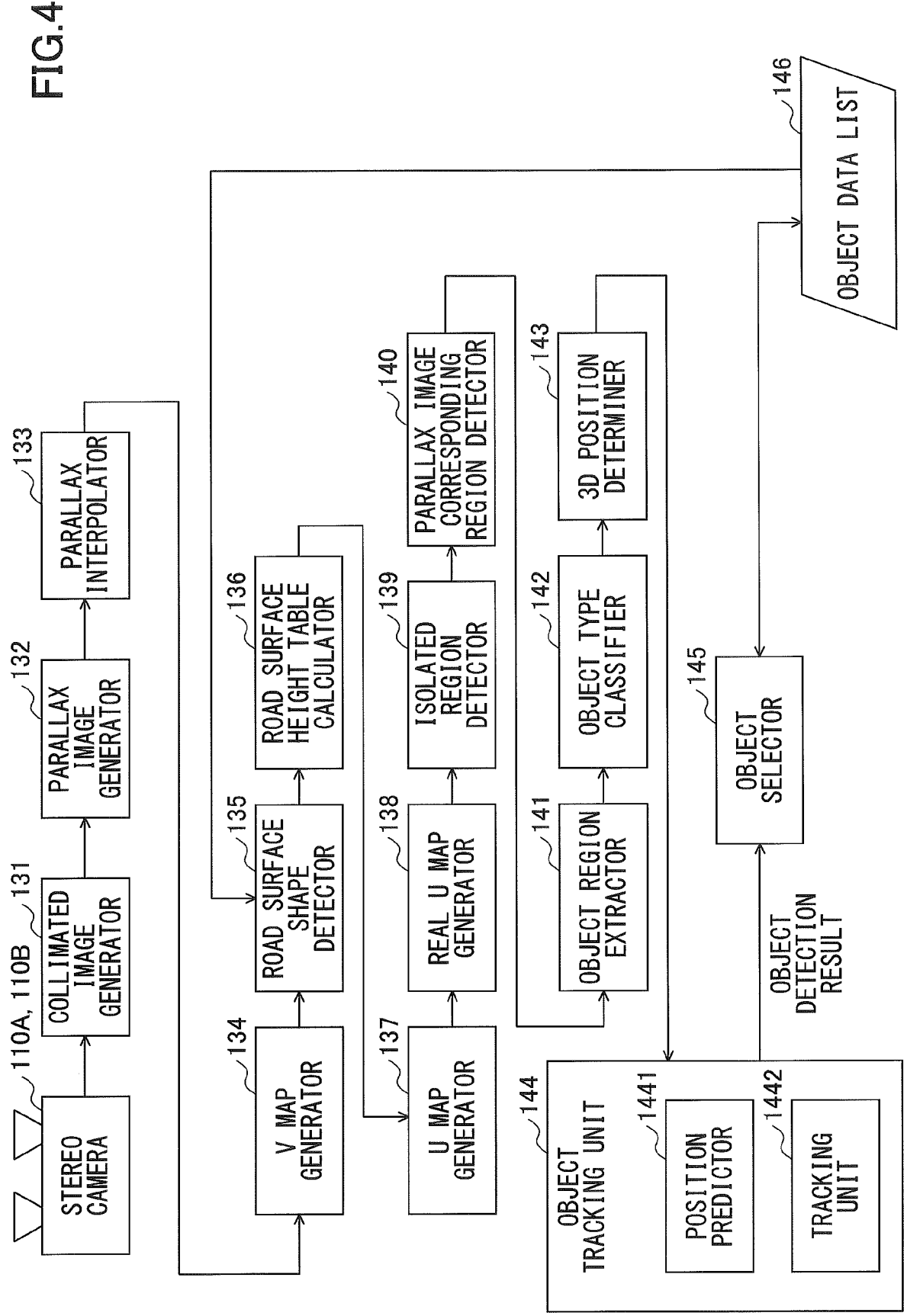
FIG. 4 is a functional block diagram illustrating functional elements for performing an object detection process, according to the embodiment.

FIG. 4 is a functional block diagram illustrating elements for performing an object detection process implemented by the process hardware unit 120 and the image analysis unit 102 in FIG. 2. The following illustrates an object detection process according to an embodiment.

The two imaging units 110a and 110b constituting a stereo camera output luminance image data. In a case where the imaging units 110a and 110b are a color support camera, color luminance conversion for obtaining luminance signals (Y) from RGB signals is performed by, for example, the following formula (1).

$$Y=0.3R+0.59G+0.11B \tag{1}$$

Collimated Image Generation Process

A collimated image generator 131 initially executes a collimated image generation process with respect to luminance image data. The collimated image generation process includes conversion of luminance image data (a reference image and a comparison image) output from the imaging units 110a and 110b into an ideal collimated stereo image obtained when two pinhole cameras are attached in parallel, based on distortion of an optical system in the imaging units 110a and 110b and a relative positional relationship between the left and right imaging units 110a and 110b. This conversion process involves calculating the amount of distortion at each pixel using a polynomial expression $\Delta x = f(x, y)$, $\Delta y = g(x, y)$, and converting each pixel of the luminance image data (the reference image and the comparison image) output from a corresponding one of the imaging units 110a and 110b using the calculated results. For example, a polynomial expression may be configured to use a fourth order polynomial expression relating to x (horizontal position of an image) and y (vertical position of the image). Instead of calculating the amount of distortion at each pixel using a polynomial expression, the amount of distortion at each pixel may be determined using a preset table.

Parallax Image Generation Process

After performing the collimated image process in this manner, the parallax image generator 132 includes the parallax calculator 121 subsequently performs a parallax image generating process for generating parallax image data (parallax image information). The parallax image generation process includes, first, setting the luminance image data of one imaging unit 110a of the two imaging units 110a and 110b as reference image data, setting the luminance image data of the other imaging unit 110b as comparison image data, calculating parallax between the two sets of the luminance image data, generating parallax image data based on the calculated parallax, and outputting the generated parallax image data. The parallax image data indicates a parallax image composed of respective image portions having respective pixel values according to parallaxes d calculated for respective image portions on the reference image data.

Specifically, the parallax image generator 132 defines a block composed of a plurality of pixels (e.g., 16 pixels×1 pixel) having one target pixel in the center with respect to a certain row of the reference image data. In the same row in the comparison image data, a correlation value, which indicates a correlation between a feature amount indicating a feature of pixel values of a block defined in the reference image data and a feature amount indicating a feature of pixel values of a corresponding block in the comparison image data, is calculated by shifting a block having the same size as the block of the defined reference image data pixel by pixel in the horizontal line direction (x direction). Then, based on the calculated correlation values, a matching process is performed to select a block of the comparison image data having the highest correlation with the block of the reference image data from among the blocks in the comparison image data. Thereafter, the positional deviation amount between the target pixel of the block of the reference image data and the corresponding pixel of the block of the comparison image data selected by the matching process is calculated as a parallax value d. The parallax image data may be obtained by performing such a process of calculating the parallax value d on the entire region or a specific region of the reference image data.

For example, a value (luminance value) of each pixel within a block may be used as a feature amount of the block for the matching process. As the correlation value, for example, the sum of the absolute values of the difference between the value (luminance value) of each of pixels in the block of the reference image data and the value (luminance value) of a corresponding one of pixels in the block of the comparison image data may be used. In this case, the block having the smallest sum has the highest correlation.

For the matching process in the parallax image generator 132 to be implemented by the hardware process, methods such as SSD (Sum of Squared Difference), ZSSD (Zero-mean Sum of Squared Difference), SAD (Sum of Absolute Difference), ZSAD (Zero-mean Sum of Absolute Difference), NCC (Normalized cross correlation), and the like may be used. Note that in the matching process, parallax values are calculated only on a pixel basis; hence, when a parallax value of less than one pixel is required, it is necessary to use an estimated value. As an estimation method for a parallax value of less than one pixel, for example, an equiangular linear fitting method, a curve fitting method or the like may be used.

Parallax Image Interpolation Process

After performing the parallax image generation process, a parallax interpolation unit 133 composed of the image analysis unit 102 performs a parallax image interpolation process.

Since the parallax value d is a degree of positional deviation in the horizontal direction, the parallax is unable to be calculated in a horizontal edge portion of the captured image 310 or a portion where the luminance change is small. Thus, a vehicle is unable to be recognized as one object. Thus, when a predetermined condition, such as a case where a distance between two points of the parallax image is shorter than a predetermined length and no other parallax value exists between the two points, is satisfied, the parallax interpolation unit 133 interpolates a parallax value between the two points.

V-Map Generation Process

After performing the parallax image interpolation process, a V map generator 134 executes a V map generation process to generate a V map. Each parallax pixel data included in the parallax image data is indicated by a set (x, y, d) of the x direction position, the y direction position, and the parallax value d. The parallax pixel data that is transformed into three-dimensional coordinate information (d, y, f), where d is set on the X axis, y is set on the Y axis, and frequency f is set on the Z axis may be generated as parallax histogram information. Or, three dimensional coordinate information (d, y, f) that is limited to information exceeding a predetermined frequency threshold value from this three-dimensional coordinate information (d, y, f) may be generated as parallax histogram information. The parallax histogram information of the present embodiment is composed of three-dimensional coordinate information (d, y, f), and this three-dimensional histogram information distributed in the XY two-dimensional coordinate system is referred to as a V-map (parallax histogram map, V-disparity map).

More specifically, the V map generator 134 calculates parallax value frequency distribution for each row region of the parallax image data obtained by dividing an image into multiple parts in a vertical direction. The information indicating the parallax value frequency distribution is parallax histogram information.

Figure 5A:
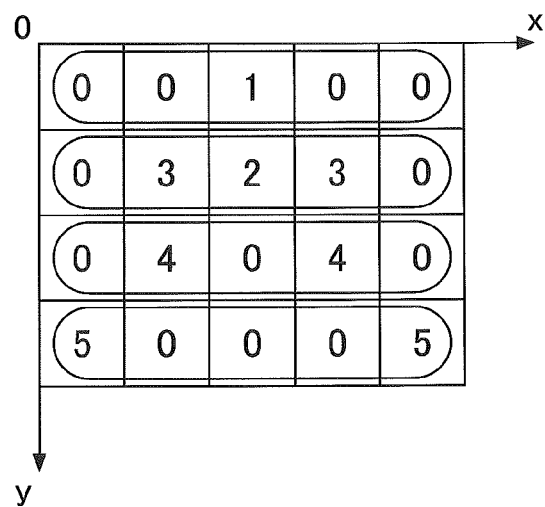
FIG. 5A is a diagram illustrating parallax image data and a V-map generated from the parallax image data.
Figure 5B:
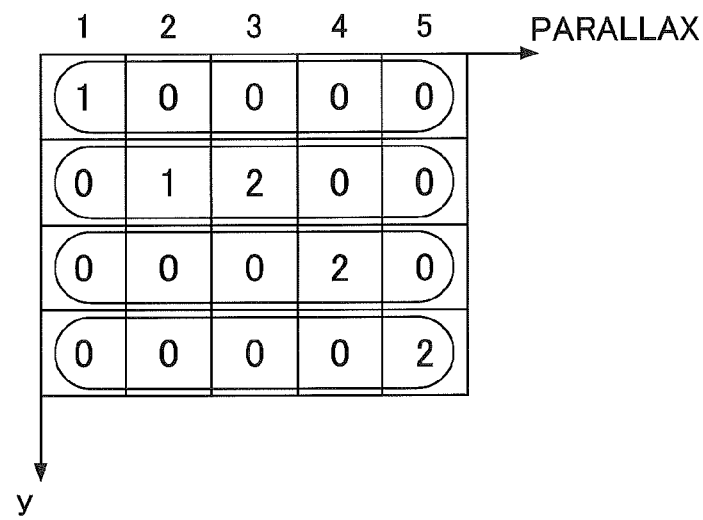
FIG. 5B is a diagram illustrating parallax image data and a V-map generated from the parallax image data.

FIGS. 5A and 5B are diagrams illustrating parallax image data and a V-map generated from the parallax image data. FIG. 5A is a diagram illustrating an example of parallax value distribution of a parallax image, and FIG. 5B is a diagram illustrating a V-map indicating the parallax value frequency distribution by each row of the parallax image in FIG. 5A.

When receiving an input of parallax image data having a parallax value distribution as illustrated in FIG. 5A, the V map generator 134 calculates a parallax value frequency distribution that is a distribution of the number of data of each parallax value for each row, and outputs the calculated parallax value frequency distribution as parallax histogram information. A V-map as illustrated in FIG. 5B may be obtained by representing information on the parallax value frequency distribution of each row obtained in this manner on a two-dimensional orthogonal coordinate system, where a y-direction position (vertical position of the captured image) on the parallax image is taken on the Y-axis and the parallax value is taken on the X-axis. This V-map may be expressed as an image composed of pixels that have pixel values according to the frequency f and that are distributed on a two-dimensional orthogonal coordinate system.

Figure 6A:
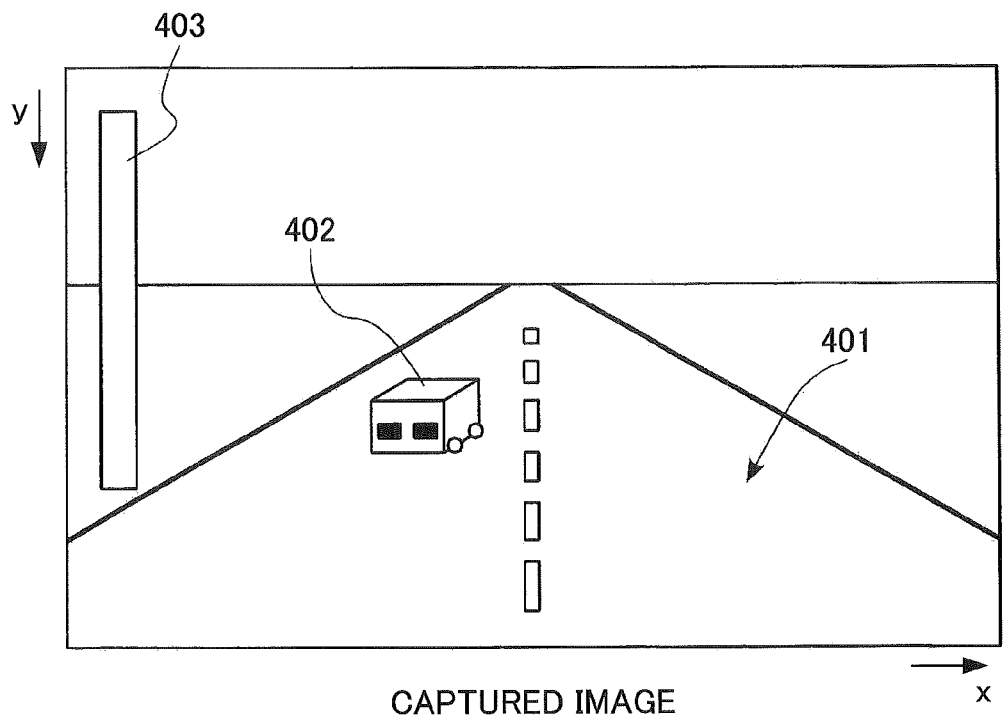
FIG. 6A is a diagram illustrating an example of a captured image as a reference image captured by one imaging unit.
Figure 6B:
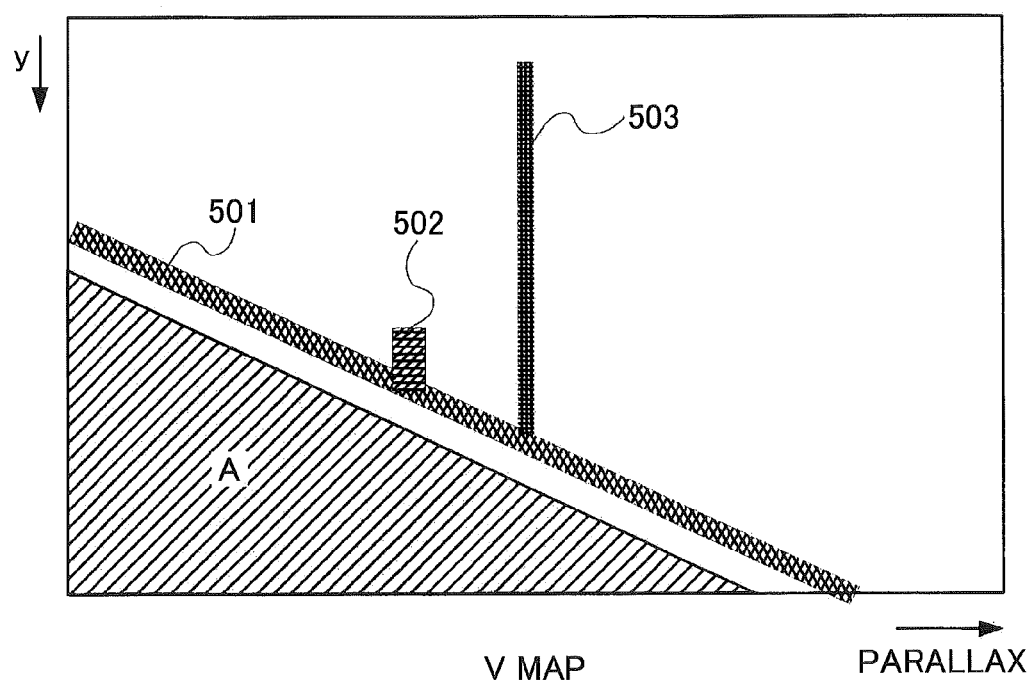
FIG. 6B is a diagram illustrating an example of a V-map corresponding to the captured image of FIG. 6A.

FIGS. 6A and 6B are diagrams illustrating an example of a captured image as a reference image captured by one imaging unit and an example of a V-map corresponding to the captured image, respectively. Note that FIG. 6A depicts the captured image, and FIG. 6B depicts the V-map. That is, the V-map illustrated in FIG. 6B is generated from the captured image as illustrated in FIG. 6A. In the V map, no parallax is detected in a region below the road surface, and the parallax is not counted in a shaded region A.

The example of an image in FIG. 6A depicts a road surface 401 on which the reference vehicle is moving, a preceding vehicle 402 existing in front of the reference vehicle, and a utility pole 403 existing off the road. The V-map in FIG. 6B depicts a road surface 501, a preceding vehicle 502, and a utility pole 503 corresponding to the example of the image of FIG. 6A.

In the example of the image in FIG. 6A, a relatively flat road surface of the road surface ahead of the reference vehicle 100 matches a virtual reference road surface (virtual reference traveling surface). In other words, a road surface in front of the reference vehicle 100, which extends parallel to the road surface portion directly under the reference vehicle 100 toward a frontward direction of the reference vehicle, matches a virtual reference road surface (virtual reference traveling surface). In this case, in a lower part of the V-map corresponding to a lower part of the image, high frequency points (the road surface 501) are distributed in a substantially linear manner with the inclination such that the parallax value d decreases toward the upper part of the image. Pixels indicating such distribution are present at approximately the same distance in each row on the parallax image, have the highest occupancy rate, and furthermore reflect a detection target having a distance becoming continuously farther toward the upper part of the image.

The imaging unit 110a captures an image in a front region of the reference vehicle, and content of the captured image indicates, as illustrated in FIG. 6B, that the parallax value d of the road surface decreases toward the upper part of the image in FIG. 6A. Further, the pixels displaying the road surface have substantially the same parallax value d within the same row (horizontal line). Accordingly, the high frequency points (road surface 501) distributed in a substantially linear manner on the V-map corresponds to the features of the pixels that display the road surface (traveling surface). Hence, pixels of points distributed on or near an approximate straight line obtained by linear approximation of high frequency points on the V map may be estimated as pixels reflecting the road surface with high accuracy. Further, the distance to the road surface portion displayed in each pixel may be obtained with high accuracy from the parallax value d of the corresponding point on the approximate straight line.

Road Surface Shape Detecting Process

Next, according to the present embodiment, a road surface shape detector 135 executes a road surface shape detection process for detecting a three-dimensional shape of the road surface ahead of the reference vehicle 100, based on V-map information (parallax histogram information) generated by the V map generator 134.

The example of an image in FIG. 6A depicts a road surface 401 on which the reference vehicle is moving, a preceding vehicle 402 existing in front of the reference vehicle, and a utility pole 403 existing off the road. In the example of the image in FIG. 6A, a relatively flat road surface ahead of the reference vehicle 100 matches a virtual reference road surface (virtual reference traveling surface). In other words, a road surface in front of the reference vehicle 100 that extends parallel to the road surface portion directly under the reference vehicle 100 toward a frontward direction of the reference vehicle, matches a virtual refer-ence road surface (virtual reference traveling surface). In this case, in a lower part of the V-map corresponding to a lower part of the image, high frequency points (the road surface 501) are distributed in a substantially linear manner with inclination such that the parallax value d decreases toward the upper part of the image. Pixels indicating such distribution are present at approximately the same distance in each row on the parallax image and have the highest occupancy rate. Furthermore, the pixels indicating such distribution reflect a detection target having a distance becoming continuously farther toward the upper part of the image.

The imaging unit 110a captures an image in a front region of the reference vehicle, and content of the captured image indicates, as illustrated in FIG. 6B, that the parallax value d of the road surface decreases toward the upper part of the image in FIG. 6A. Further, pixels displaying a road surface have substantially the same parallax value d within the same row (horizontal line). Accordingly, the high frequency points (road surface 501) distributed along an approximation straight line in the V-map corresponds to the feature of the pixels depicting the road surface (moving surface). Hence, pixels of points distributed on or near an approximate straight line obtained by linear approximation of high frequency points on the V map may be estimated as pixels reflecting the road surface with high accuracy. Further, the distance to the road surface portion displayed in each pixel may be obtained with high accuracy from the parallax value d of the corresponding point on the approximate straight line.

Road Surface Height Table Calculation Process

Next, a road surface height table calculator 136 performs a road surface height table calculation process for calculating a height of the road surface (a relative height with respect to the road surface portion directly under the reference vehicle) and tabulating the calculated results. The road surface height table calculator 136 may calculate the distance to each road surface portion displayed in each row region (each position in the vertical direction of the image) on the captured image, from approximate straight line information on the V map generated by the road surface shape detector 135. It is predetermined which row region in the captured image is to display each road surface portion in a vehicle traveling direction of the virtual plane, which is obtained by extending a road surface portion located directly under the reference vehicle in the forward traveling direction of the reference vehicle in parallel with the road surface portion. This virtual plane (reference road surface) is represented by a straight line (reference straight line) on the V map. By comparing an approximate straight line output from the road surface shape detector 135 with the reference straight line, it is possible to obtain the height of each road surface portion ahead of the reference vehicle. In a simplified method, the height of the road surface portion existing in front of the reference vehicle may be calculated from the Y axis position on the approximate straight line output from the road surface shape detector 135 by the distance obtained from the corresponding parallax value. The road surface height table calculator 136 tabulates the height of each road surface portion obtained from the approximate straight line with respect to the necessary parallax range.

Note that the height of an object displayed on the captured image portion corresponding to a certain point where the Y axis position is y' at a parallax value d from the road surface may be calculated from (y'−y0) when the Y-axis position on the approximate straight line at the parallax value d is y0. In general, the height H of the object corresponding to the coordinates (d, y') on the V map from the road surface may be calculated from the following formula (2). Note that "Z" in the formula (2) is a distance (Z=BF/(d-offset)) calculated from the parallax value d, and "f" is a value obtained by converting a focal distance of a camera into the same unit as that of (y'−Y0). Note that "BF" is a value obtained by multiplying the baseline length of a stereo camera by the focal length, and "offset" is a parallax value when an object at infinity is imaged.

$$H = z \times (y'-y0)/f \quad (2)$$

U-Map Generation Process

Next, as a U-map generation process for generating a U-map (U-disparity map), a U-map generator 137 performs a frequency U-map generation process and a height U-map generation process.

In the frequency U map generation process, the U-map generator 137 generates XY two-dimensional histogram information by setting a set (x, y, d) of x being an x direction position, y being a y direction position, and d being a parallax value d in each parallax pixel data included in the parallax image data, such that x is set on X axis, d is set on Y axis, and the frequency is set on Z axis. This XY two-dimensional histogram information is called a frequency U map. The U map generator 137 of the present embodiment generates a frequency U map only for the points (x, y, d) of the parallax image in which the height H from the road surface is within a predetermined height range (e.g., 20 cm to 3 m), based on the height of each road surface portion tabulated by the road surface height table calculator 136. In this case, it is possible to appropriately extract an object existing in the predetermined height range from the road surface.

Further, in the height U map generation process, the U-map generator 137 generates XY two-dimensional histogram information based on the set (x, y, d), where x is an x direction position, y is a y direction position, and d is a parallax value for each parallax pixel data included in the parallax image data, by setting x on the X axis, d on the Y axis, and the height from the road surface on the Z axis. This XY two-dimensional histogram information is called a height U map. The value of the height in this case is the highest from the road surface.

Figure 7:
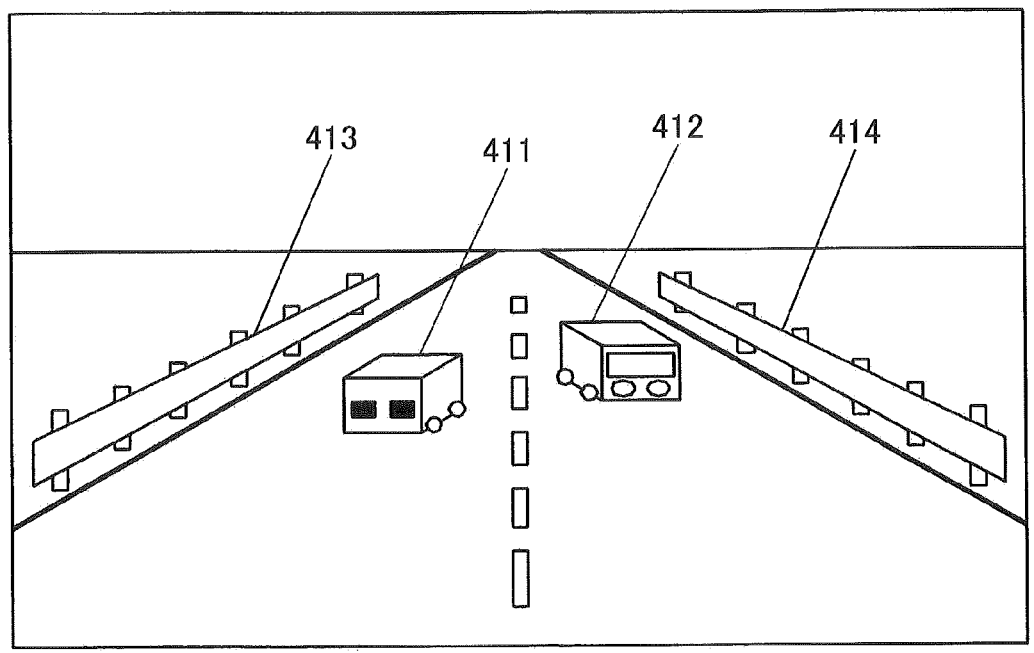
FIG. 7 is a diagram illustrating an example of an image schematically representing an example of a reference image.
Figure 8A:
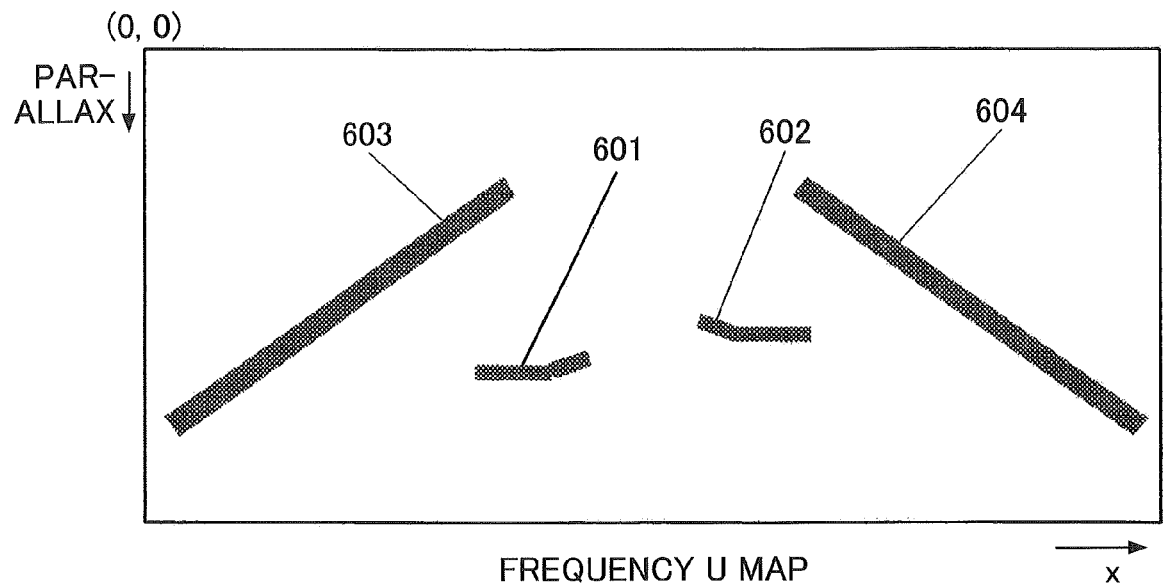
FIG. 8A is a diagram illustrating a frequency U map corresponding to an example of an image.
Figure 8B:
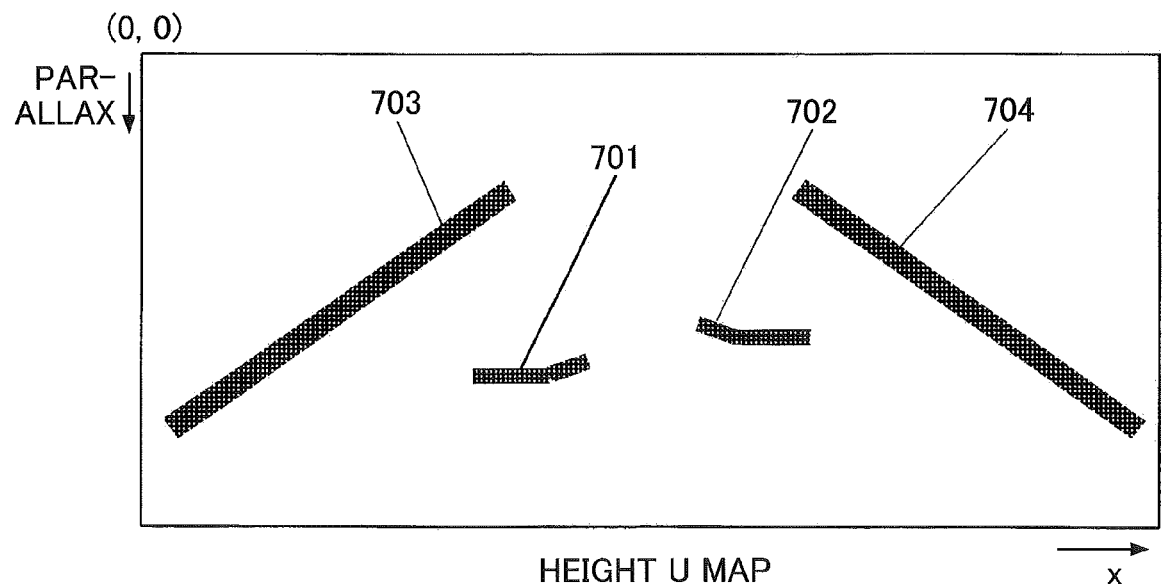
FIG. 8B is a diagram a height illustrating U maps corresponding to an example of an image.

FIG. 7 is an example of an image schematically illustrating an example of a reference image taken by the imaging unit 110a, and FIGS. 8A and 8B are U maps corresponding to the example of the image in FIG. 7. Note that FIG. 8A is a frequency U map, and FIG. 8B is a height U map.

In the image example illustrated in FIG. 7 the guardrails 413 and 414 are present on the left and right sides of a road surface and other respective vehicles are one preceding vehicle 411 and one oncoming vehicle 412. In the frequency U map, as illustrated in FIG. 8A, the high frequency points distributed corresponding to the left and right guardrails 413 and 414 are substantially linear shapes 603 and 604 extending upward toward the center from the left and right end sides. Meanwhile, high frequency points corresponding to the preceding vehicle 411 and the oncoming vehicle 412 are distributed between the right and left guardrails as line segments 601 and 602 extending in parallel to a substantially X axis direction. Note that in a situation where the side portions of the preceding vehicle 411 and oncoming vehicle 412 are reflected in addition to the back portion of the preceding vehicle 411 or the front portion of the oncoming vehicle 412, parallax may occur in an image region where the same other vehicles 411 and 412 are reflected. In such a case, as illustrated in FIG. 8A, high frequency points corresponding to another vehicle represent a distribution of a line segment extending in parallel to an approximately X axis direction, which is coupled to a line segment inclined with respect to the approximately X axis direction.

Further, in the height U map, the highest points from the road surface in the left and right guard rails 413, 414, the preceding vehicle 411, and the oncoming vehicle 412 are distributed in the same manner as the frequency U map. In this case, the height of a distribution 701 of the points corresponding to the preceding vehicle and the height of a distribution 702 of the points corresponding to the oncoming vehicle are higher than distributions 703 and 704 of the points corresponding to the guardrails, respectively. Accordingly, height information of an object in the height U map may be used for object detection.

Real Map Generation Process

Next, a description is given of a real U map generator 138. As a U map generation process for generating a real U map (Real U-disparity map) (e.g., an example of "distribution data"), the real U map generator 138 performs a real frequency U map generation process and a real height U map generation process.

The real U map is obtained by converting a horizontal axis in the U map into an actual distance based on pixels of an image, and converting a parallax value of a vertical axis into a thin-out parallax having a thin-out rate according to distance.

In the real frequency U map generation process, the real U map generator 138 generates XY two-dimensional histogram information based on a set (x, y, d), where x is an x direction position, y is a y direction position and d is a parallax value in each parallax pixel data included in the parallax image data, by setting the actual distance in the horizontal direction in X axis, the thin-out parallax in the Y axis, and the frequency in the Z axis. Similar to the U map generator 137, the real U map generator 138 of the present embodiment generates a real frequency U map only having points (x, y, d) of the parallax image whose heights H from the road surface are in a predetermined height range, based on the height of each of road surface portions tabulated by the road surface height table calculator 136. Note that the real U map generator 138 may generate a real U map based on the U map generated by the U map generator 137.

Figure 9:
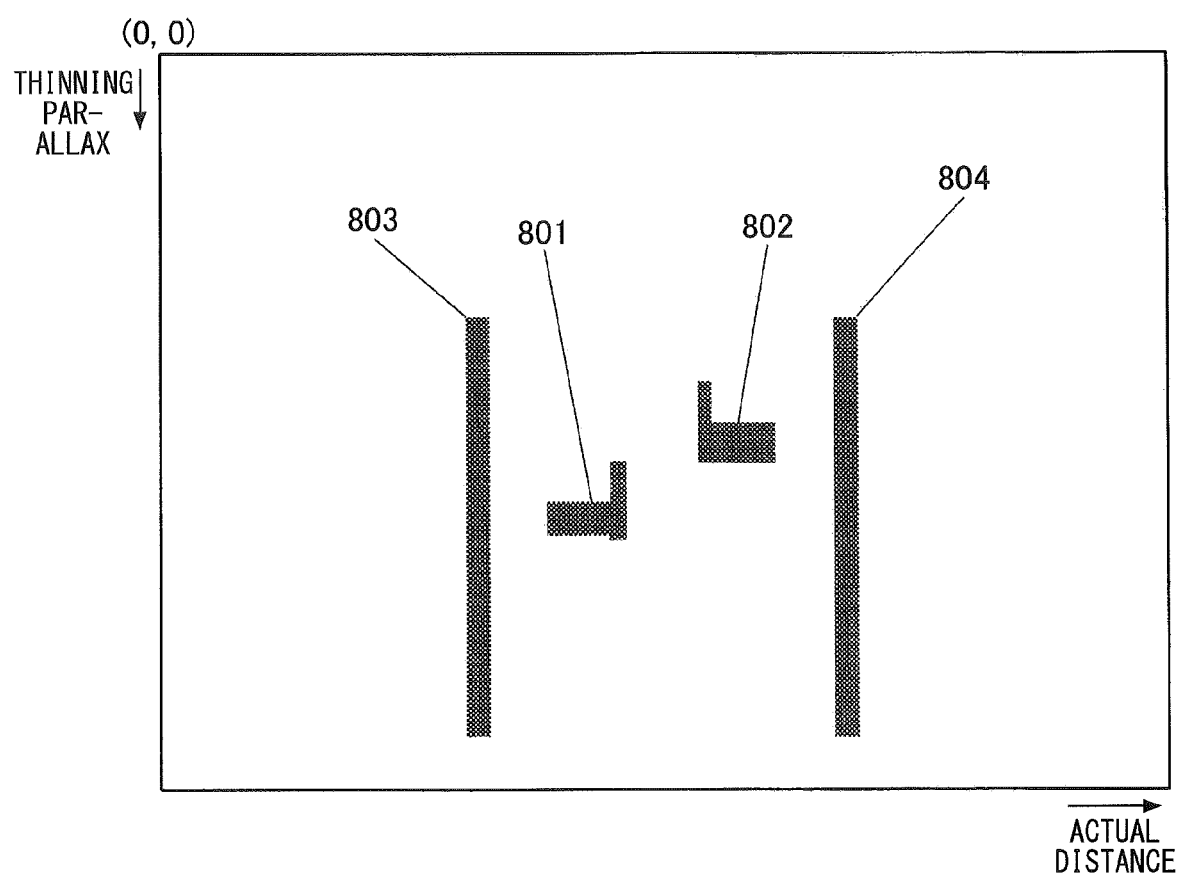
FIG. 9 is a diagram illustrating a real U map corresponding to a U map.

FIG. 9 is a diagram illustrating a real U map (hereinafter referred to as "real frequency U map") corresponding to the frequency U map illustrated in FIG. 8A. As illustrated in FIG. 9, left and right guardrails are represented by vertical linear patterns 803 and 804, and the preceding vehicle and the oncoming vehicle are also represented by patterns 801 and 802 close to the actual shapes of the preceding vehicle and the oncoming vehicle.

The thin-out parallax of the vertical axis is defined such that no thin-out is applied to a long distance (in this case, 50 m or more), ½ thin-out is applied to a medium distance (20 m or more and less than 50 m), and ⅓ thin-out is applied to a short distance (10 m or more, less than 20 m), and ⅛ thin-out is applied to an ultrashort distance (less than 10 m).

In other words, the farther the distance, the smaller the amount of thin-out. The reason for such an arrangement is as follows. Since an object situated at a long distance is reflected as being small in size, the amount of the parallax data is small, and the distance resolution is also small. Accordingly, the amount of the thin-out is reduced. By contrast, since an object situated at a closer distance is reflected as being large in size, the amount of parallax data is large, and the distance resolution is large. Accordingly, the amount of the thin-out is increased.

A method of converting a horizontal axis from pixels of an image into the actual distance, and a method of obtaining (X, d) of a real U map from (x, d) of the U map will be described with reference to FIG. 10.

A width between a left position and a right position each at a distance of 10 m viewed from camera, that is, a width of 20 m, is set as an object detection range. It is assumed that when the width of one pixel in the horizontal direction of the real U map is 10 cm, the horizontal size of the real U map corresponds to the width of 200 pixels.

Figure 10:
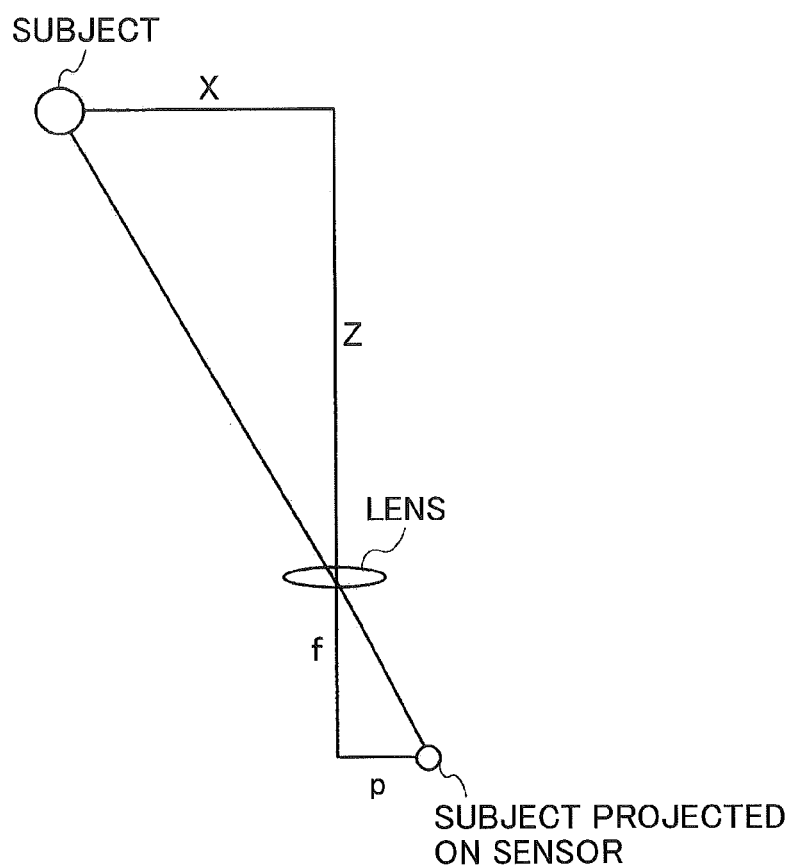
FIG. 10 is a diagram illustrating a method of obtaining a value on a horizontal axis of a real U map from a value on a horizontal axis of a U map.

It is assumed that in FIG. 10, f is a focal distance of the camera, p is a position of the camera in horizontal direction from the camera center, Z is a distance from the camera to a subject, and X is a position of the subject in the horizontal direction from the camera center. It is assumed that when a pixel size of the sensor is s, a relationship between x and p is expressed by "x=p/s". Further, there is a relationship expressed by "Z=Bf/d", which is obtained based on the characteristics of a stereo camera.

Further, according to FIG. 10, there appears a relationship expressed by "X=p*Z/f", and thus "X" may be expressed by the formula "X=s×B/d". X is an actual distance; however, the width of one pixel in the horizontal direction on the real U map is 10 cm. Hence, it is possible to easily calculate a position X on the real U map.

A real U map (hereinafter referred to as real height U map) corresponding to the height U map illustrated in FIG. 8B may also be generated by the same procedure.

The real U map may provide an advantageous effect of being processed at high rates because the vertical or horizontal length may be made smaller than that of the U map. Further, since the horizontal direction does not depend on a distance in the real U map, the same object may be detected with the same width regardless of distance. This may also provide an advantageous effect of simplifying a subsequent process of removing a peripheral region or simplifying a subsequent process of branching a process to horizontal separation and vertical separation (width threshold value process).

The length of the U map in the vertical direction is determined based on the shortest measurable distance. That is, since "d=Bf/Z", the maximum value of d is determined according to the smallest measurable distance Z. Further, the parallax value d is normally calculated in units of pixels in processing a stereo image. However, the parallax value d includes a decimal portion. Hence, the parallax value is multiplied by a predetermined value to round off the decimal portion of the resulting parallax value to the nearest integer, which is used as the parallax value as a result.

When the shortest measurable distance Z becomes ½, the parallax value d is doubled. Thus, the U map data is drastically increased by that extent. Accordingly, to generate a real U map, data is compressed by thinning out more pixels such that the amount of data of the real U map is smaller than the amount of data of a U map.

As a result, it is possible to perform object detection by using labeling at a higher rate.

Isolated Region Detection

Figure 11:
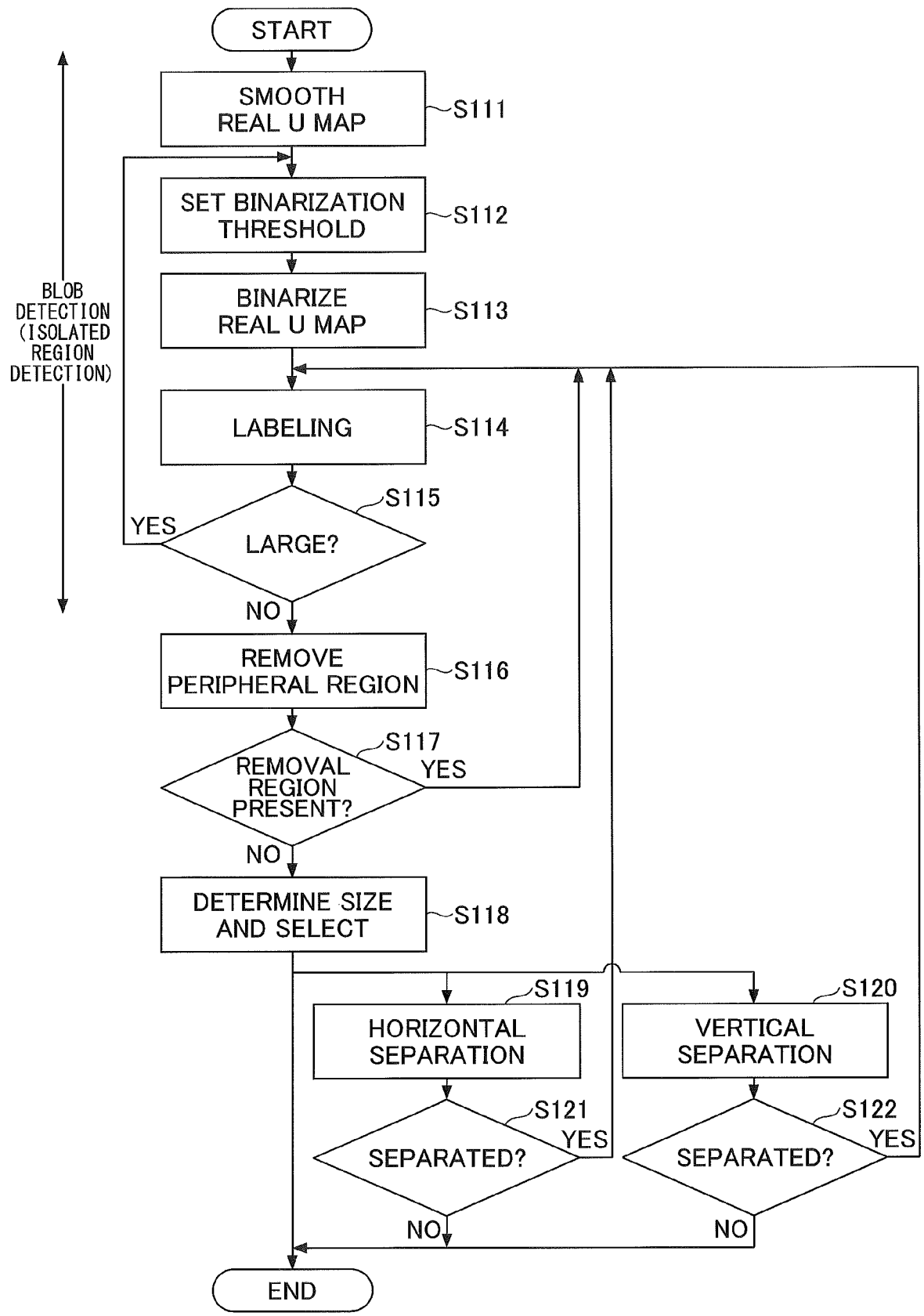
FIG. 11 is a flowchart illustrating an isolated region detection process performed by an isolated region detector.

Next, an isolated region detector 139 is described. FIG. 11 is a flowchart illustrating an isolated region detection process performed by an isolated region detector 139. The isolated region detector 139 first smoothes real frequency U map information generated by the real U map generator 138 (step S111).

This smoothing is performed because averaging the frequency values will facilitate detection of an effective isolated region. In other words, the parallax value may include a calculation error and may thus vary, and the parallax value is calculated not for all the pixels. Hence, the real U map includes noise, and thus differs from the schematic diagram illustrated in FIG. 9. Accordingly, the real U map is smoothed in order to remove noise and to facilitate separation of the object desired to be detected. Similar to the smoothing of the image, the smoothing of the real U map may provide an advantageous effect of facilitating a subsequent isolated region detection process; that is, a smoothing filter (simple mean of 3×3 pixels) is applied to the frequency value of the real U map (real frequency U map) such that the frequency considered as noise is decreased and the frequency in the object portion that is greater than that of the periphery may be collected as a group; this will facilitate the subsequent isolated region detection process.

Next, a binarization threshold value is set (step S112). Initially, binarization of the smoothed real U map is performed using a small value (=0) (step S113). Then, labeling of coordinates with values is performed to detect an isolated region (step S114).

In these two steps, an isolated region (to be referred to as an island) whose frequency is higher than the peripheral frequency is detected in the real frequency U map. In order to detect an isolated region, the real frequency U map is initially binarized (step S113). Binarization is initially performed with a threshold value of 0. This is a countermeasure against the fact that some islands are isolated, while others are connected to other islands due to the height and shape of the object, separation from the road parallax, and the like. That is, in order to detect an island with an appropriate size, initially isolated islands with an appropriate size are detected by binarizing the real frequency U map from a small threshold value, and thereafter, the connected islands are isolated by gradually increasing the threshold values.

Labeling is used as a method of detecting islands after binarization (step S114). The binary coordinates (coordinates whose frequency value is higher than the binarization threshold value) are labeled on the basis of the connectivity, and regions labeled with the same label are regarded as an island.

The size of each of the detected isolated regions is determined (step S115). Since an object to be detected varies from a pedestrian to a large automobile, whether the width of the detected isolated region is within a range of the corresponding size needs to be determined. When the size of the isolated region is greater than the corresponding size range (step S115: YES), the binarization threshold value is incremented by one (step S112), and binarization is performed only within the isolated region of the real frequency U map (step S113). Subsequently, labeling is performed, a smaller isolated region is detected (step S114), and the size of the smaller isolated region is determined (step S115).

A process from the above-described threshold value setting to the labeling is repeatedly performed to detect an isolated region with a desired size. When an isolated region with a desired size is detected (step S115: NO), a peripheral region of the detected isolated region with the desired size is subsequently removed (step S116). This process is detailed as follows. In a case where the accuracy of the road surface detection is poor for an object located in the distance, the parallax of the road surface is introduced into the real U map, and the parallax between the object and the road surface is detected as one block, a peripheral region of the detected block having the height close to the road surface (the peripheral portion within the isolated region) is removed. When there is a removal region (step S117: YES), labeling is performed again to reset an isolated region (step S114).

When there is no removal region (step S117: NO), the size (width and height, distance) of the isolated region from which the peripheral region has been removed is determined (step S118). Subsequently, according to result, the resulting isolated region is registered as a candidate object with performing of horizontal separation (step S119) or of vertical separation (step S120), or is registered as a candidate object without performing vertical or horizontal separation. When horizontal separation or vertical separation is performed (step S121: YES, or step S122: YES), the isolated region is reset by performing labeling again (step S114).

In the case where objects are alongside by each other (automobile and motorcycle, car and pedestrian, car-to-car), these alongside objects may be detected as one isolated region due to smoothing of the real frequency U map. Or, parallax between different objects may be connected due to an adverse effect of parallax interpolation of the parallax image. Horizontal separation is a process of detecting and separating such connected cases (details will be described later).

Further, when a plurality of preceding vehicles are traveling in the neighboring lane in the distance, or when the parallax (disparity) dispersion obtained from the stereo image is large, the parallax value of each object may extend upward and downward to be connected. As a result, these objects may be detected as one isolated region in some cases. Vertical separation is a process of detecting such a case and separating the detected isolated region into a first preceding vehicle traveling immediately in front of the reference vehicle and a second preceding vehicle traveling ahead of the first preceding vehicle that is traveling immediately in front of the reference vehicle (details will be described later).

Figure 12:
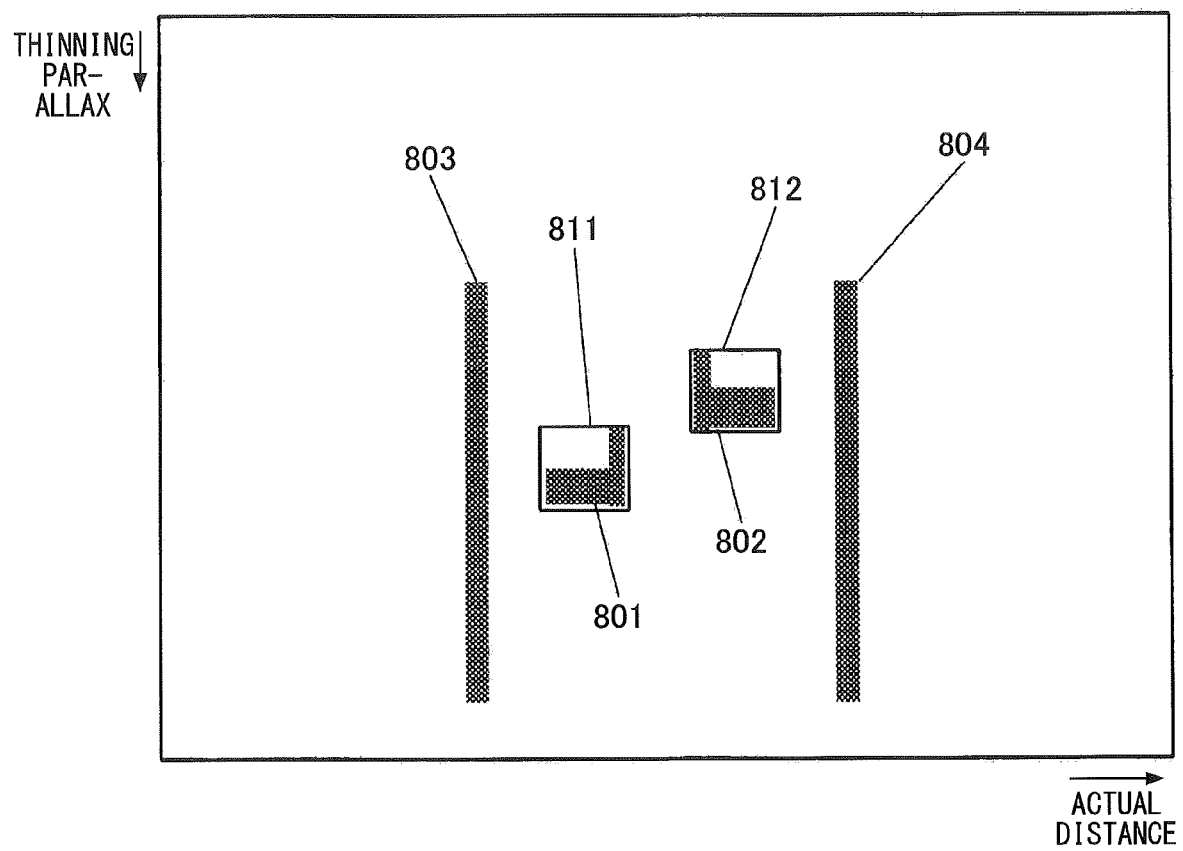
FIG. 12 is a diagram illustrating a real frequency U map in which rectangular regions having respective inscribed isolated regions detected by the isolated region detector are set.
Figure 13:
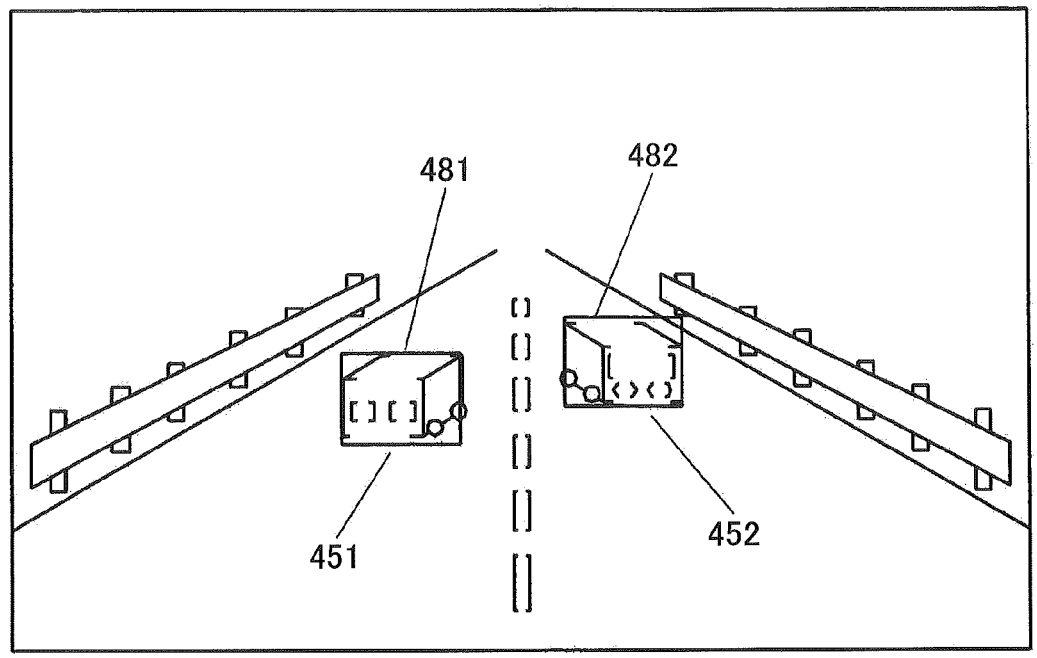
FIG. 13 is a diagram illustrating a parallax image in which scanning ranges corresponding to respective rectangular regions are set.
Figure 14:
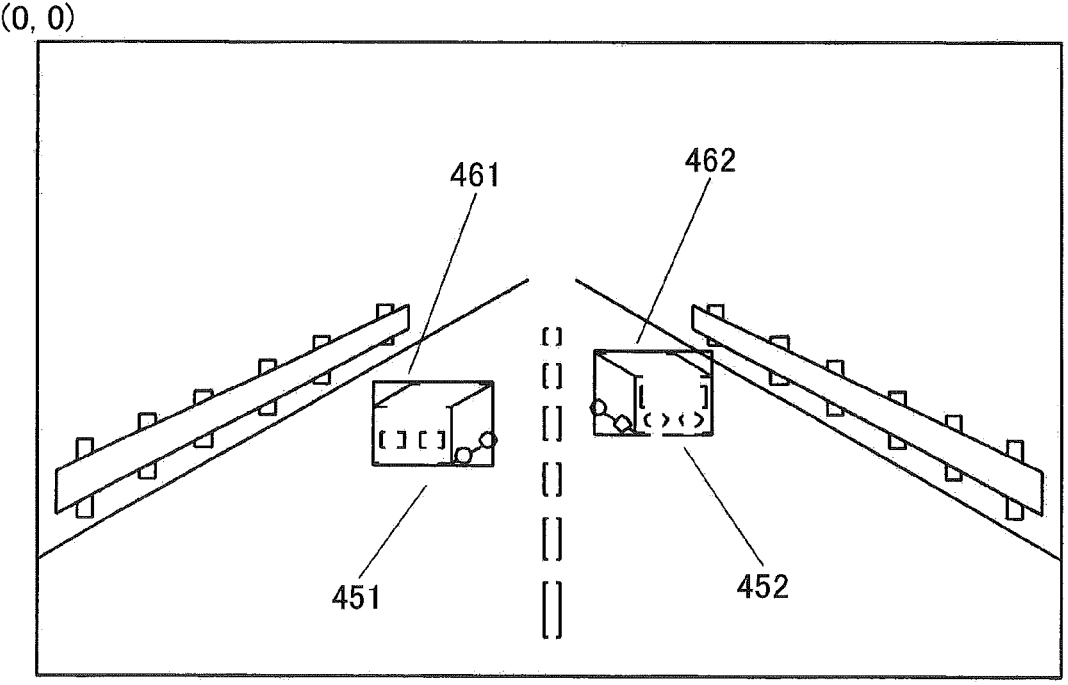
FIG. 14 is a diagram illustrating a parallax image in which object regions are set by searching the respective scanning ranges.

Detection of Parallax Image Corresponding Region and Extraction of Object Region Next, a description is given of a corresponding parallax image region detector 140 and an object region extractor 141. FIG. 12 is a diagram illustrating a real frequency U map in which a rectangular region inscribed in the isolated region detected by the isolated region detector is set. FIG. 13 is a diagram illustrating a parallax image in which a scanning range corresponding to the rectangular region in FIG. 12 is set. FIG. 14 is a diagram illustrating a parallax image in which an object region is set by searching the scanning range in FIG. 13.

As illustrated in FIG. 12, when a first detected island 811 and a second detected island 812 are set as rectangular regions having respective inscribed first vehicle 801 and second vehicle 802 as the isolated regions, the width (the length in the X axis direction on the U map) of the rectangular region corresponds to the width of an identification object representing the corresponding isolated region. Further, the height of the set rectangular region corresponds to the depth (length in the traveling direction of the reference vehicle) of the identification object corresponding to the isolated region. The height of the identification object corresponding to each isolated region is unknown at this point. The corresponding parallax image region detector 140 detects a region on the parallax image corresponding to the isolated region in order to obtain the height of the object associated with the isolated region of the candidate object region.

Based on the isolated region information output from the isolated region detector 139, the corresponding parallax image region detector 140 determines an x direction range (xmin, xmax) of the first detected island corresponding region scanning range 481 and the second detected island corresponding region scanning range 482 to be detected in the parallax image illustrated in FIG. 13, from respective positions, widths and minimum parallax of the first detected island 811 and the second detected island 812 detected from the real U map. Further, the corresponding parallax image region detector 140 determines the height and position (from y min="y coordinate value corresponding to the maximum height from the road surface at the maximum parallax d max" to ymax="y coordinate value indicating the height of the road surface obtained from the maximum parallax dmax") of the object in the parallax image.

Next, in order to detect the exact positions of the objects, the set scanning range is scanned and pixels having parallax values of the range of the rectangular depth (minimum parallax dmin, maximum parallax dmax) detected by the isolated region detector 139 are extracted as candidate pixels. Then, a line having a predetermined ratio or more in the horizontal direction with respect to the detected width in the extracted candidate pixel group is set as a candidate object line.

Next, the scanning is performed in the vertical direction; in a case where the density of other candidate object lines present around a specific candidate object line is a predetermined density or more, the specific candidate object line is determined as an object line.

Next, the object region extractor 141 searches a search region of the parallax image for the object line, determines the lowermost end and the uppermost end of the object line, and determines circumscribed rectangles 461 and 462 of an object line group as the regions 451 and 452 of the objects (the first vehicle, the second vehicle) in the parallax image as illustrated in FIG. 14.

Figure 15:
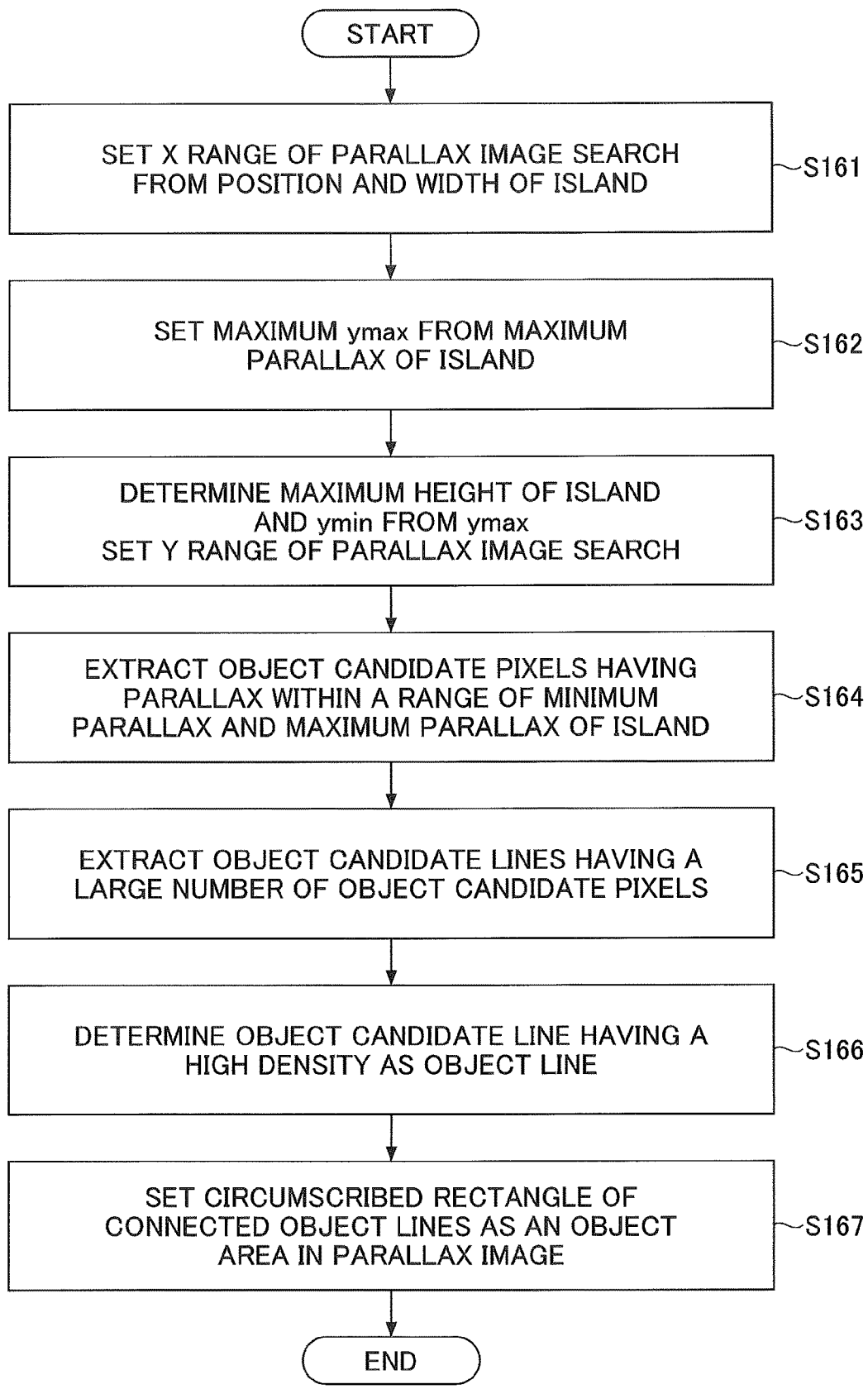
FIG. 15 is a flowchart illustrating a process performed by a corresponding parallax image region detector and an object region extractor.

FIG. 15 is a flowchart illustrating a process performed by a corresponding parallax image region detector 140 and an object region extractor 141. First, a search range in the x axis direction with respect to the parallax image is set based on position, width and minimum parallax of an island in the real U map (step S161).

Next, the maximum search value ymax in the y axis direction with respect to the parallax image is set based on a relationship between the maximum parallax dmax of the island and the height of the road surface (step S162). Then, a minimum search value ymin in the y axis direction with respect to the parallax image is obtained based on the maximum height of the island in the real height U map, and ymax and dmax set in step S172, and a search range in the y axis direction with respect to the parallax image is set by setting the obtained minimum search value ymin in the y axis direction with respect to the parallax image (step S163).

Next, the set search range is searched for a parallax image to extract pixels within a range of the minimum parallax dmin and the maximum parallax dmax of the island to be candidate object pixels (step S164). When the candidate object pixels are located at a certain ratio or more in the horizontal direction, the line of the candidate object pixels is extracted as a candidate object line (step S165).

When the density of the candidate object lines is calculated, and the calculated density of the candidate object lines is greater than a predetermined value, the line extracted as a candidate object line is determined as the object line (step S166). Finally, a circumscribed rectangle of the object line group is detected as an object region within the parallax image (step S167).

As a result, the identification object (object, body) may be recognized.

Object Type Classification

Next, an object type classifier 142 will be described.

Based on the height (yomax−yomin) of the object region extracted by the object region extractor 141, the actual height Ho of the identification object reflected in the image region corresponding to the object region may be calculated by the following formula (3). Note that "zo" is a distance between an object corresponding to the object region and the reference vehicle calculated based on the minimum parallax value d within the object region, and "f" is a value obtained by converting the focal length of the camera into the same unit of (yomax−yomin).

$$Ho = zo \times (yo\,\text{max} - yo\,\text{min})/f \quad (3)$$

Similarly, based on the width (xomax−xomin) of the object region extracted by the object region extractor 141, the actual width Wo of the identification object displayed in the image region corresponding to the object region may be calculated by the following formula (4).

$$Wo = zo \times (xo\,\text{max} - xo\,\text{min})/f \quad (4)$$

Further, based on the maximum parallax dmax and the minimum parallax dmin within the isolated region corresponding to the object region, the depth Do of the identification object displayed in the image region corresponding to the object region is calculated by the following formula (5).

$$Do = BF \times \{(1/(d\,\text{min-offset}) - 1/(d\,\text{max-offset})\} \quad (5)$$

The object type classifier 142 classifies an object type based on the information on height, width, and depth of the object corresponding to the object region calculated in this way. The table depicted in FIG. 16 indicates an example of table data for classifying object types. According to this classification, whether the identification object present in front of the reference vehicle is a pedestrian, a bicycle or a motorcycle, a compact car, a truck or the like may be distinguished and identified.

3D Position Determination

Next, a 3D position determiner 143 is described. It is possible to determine a three-dimensional position of an object, because the distance to the object corresponding to the detected object region, and the distance on an image between the center of the parallax image and the center of the object region on the parallax image are identified.

When the center coordinates of the object region on the parallax image are (region_centerX, region_centerY) and the image center coordinates of the parallax image are (image_centerX, imagecenterY), the relative horizontal position and height direction position of the identification object with respect to the imaging units 110a and 110b may be calculated from the following formulas (6) and (7).

$$Xo = Z \times (\text{region\_centerX} - \text{image\_centerX})/f \quad (6)$$

$$Yo = Z \times (\text{region\_centerY} - \text{image\_centerY})/f \quad (7)$$

Object Data List

Next, an object data list 146 used by an object tracking unit 144 and the like will be described. The object data list 146 is used, for example, to track each object detected from one frame over a plurality of subsequent frames using the object data list 146.

As illustrated in FIG. 17, the object data list 146 includes data of "object data", "object prediction data", "object features", and "tracking data".

The "object data" includes data of "position", "size", "distance", "relative velocity", "actual position", and "actual size". The "position" is upper left coordinates of the object in the parallax image. The "size" is the size (number of pixels of width and height) of an object in the parallax image. The "distance" is the actual distance from the reference vehicle to an object. The "relative velocity" is a relative velocity between the reference vehicle and an object calculated based on each real U map generated from the previous and current frames. The "relative velocity" includes data on the amount of movement (m: meters) per frame in the traveling direction Z (depth direction) and horizontal direction X (lateral direction) of the reference vehicle. The "actual position" is a relative actual position of an object with respect to the reference vehicle calculated based on the real U map for the current frame. The "actual position" includes data of a position (m: meters) in the horizontal direction X of, for example, the center of the left end and the right end of the object and a position (m: meters) in the depth Z direction. The "actual size" is the actual size of an object with respect to the reference vehicle calculated based on the real U map and the real height U map for the current frame. The "actual size" includes data of the width (m: meters) and height (m: meters) of the object.

The "object prediction data" includes data of "position", "size", "distance", "relative velocity", and the like. The "object prediction data" is data for predicting the position of an object in the next frame, which is calculated based on the previous frame (e.g., the immediately preceding frame).

The "object features" includes data of "histogram peak position" and "peak-to-peak distance". The "histogram peak position" is coordinates of a position where the value of the parallax frequency in the real U map is relatively large. The "peak-to-peak distance" is the actual distance between "histogram peak positions" in the real U map.

The "tracking data" includes data of "number of detected frames", "number of undetected frames", "tracking status", and "image". The "number of detected frames" and "number of undetected frames" are values indicating how many consecutive frames of an object have been detected or how many consecutive frames have not been detected, respectively. The "tracking status" indicates a status regarding continuity of tracking (tracking) of the object. The "tracking status" has a "tracking" or "candidate" status. The "tracking" status is a status in which tracking of the object is stably continued.

The "candidate" status indicates a status in which tracking of the object is not continued because a newly detected or tracked object was lost, but an attempt is made to stably detect the object in order to transition the object back to the "tracking" status again.

The "image" is an image of a region including the object in the parallax image when the "tracking status" is in the "tracking".

Note that data of the object data list are sent as analysis results of the image analysis unit 102 to the display monitor 103 and the vehicle travel control unit 104. For example, based on the "position" and "size" of the "object data" among the data of the object data list 146 as the analysis results, the display monitor 103 displays a region of an object in the current frame with a green frame (see a rectangle 554 in FIG. 23A). Here, the "position" and "size" of "object data" indicate data of a region of an object detected by the object region extractor 141 or data of a region obtained by integrating a plurality of regions by the object tracking unit 144.

Further, based on the "position" and "size" of the "object prediction data" among the data of the object data list 146 as the analysis results, the display monitor 103 displays a region (hereinafter referred to as "tracking frame") corresponding to a predicted position of the object in the current frame with a red frame (see a rectangle 551 in FIG. 23A).

Object Tracking

Next, an object tracking unit 144 is described. The object tracking unit 144 executes, using the object data list 146, a process of tracking an object that has been detected from the previous (past) parallax image frame.

The object tracking unit 144 has a position predictor 1441 and a tracking unit 1442.

The position predictor 1441 predicts a position of each object in a real U map with respect to the parallax image of the current frame, based on real U maps with respect to the parallax images of the plurality of previous frames generated by the real U map generator 138.

The position predictor 1441 predicts a predicted position of the integrated object in a real U map for the next parallax image, based on the position of the object integrated by the tracking unit 1442 described later in the real U map.

The position predictor 1441 predicts a plurality of prediction positions, based on the position of the object in the real U map with respect to the previous (e.g., immediately previous) parallax image and the relative velocity of the object with respect to the reference vehicle.

The tracking unit 1442 integrates a plurality of objects detected by the isolated region detector 139 based on the predicted positions of the current tracking objects predicted by the position predictor 1441, and tracks the integrated object in accordance with the parallax images of subsequent frames. For example, the tracking unit 1442 integrates a plurality of objects into one object by calculating a rectangle that includes regions of a plurality of objects in the parallax image and using the rectangle as a region of the integrated one object.

The tracking unit 1442 determines whether to integrate the plurality of objects based on distance in the real U map between the plurality of objects and the relative velocities of the plurality of objects with respect to the reference vehicle.

The tracking unit 1442 determines whether to integrate the plurality of objects, based on whether each of regions of the parallax images for a plurality of objects is included in a region of the parallax image of the current frame with respect to the object at the predicted position predicted by the position prediction unit 1441, and based on respective distances in the real U map between the predicted positions and the plurality of objects.

The tracking unit 1442 tracks the integrated object based on a distance between the predicted position predicted by the position predictor 1441 and the position of the object in the real U map with respect to the parallax image of the current frame, or based on the ratio at which a region in the parallax image of the current frame with respect to the predicted position and a region of the object in the parallax image of the current frame overlap.

The following illustrates an example of a process performed by the object tracking unit 144.

Figure 18:
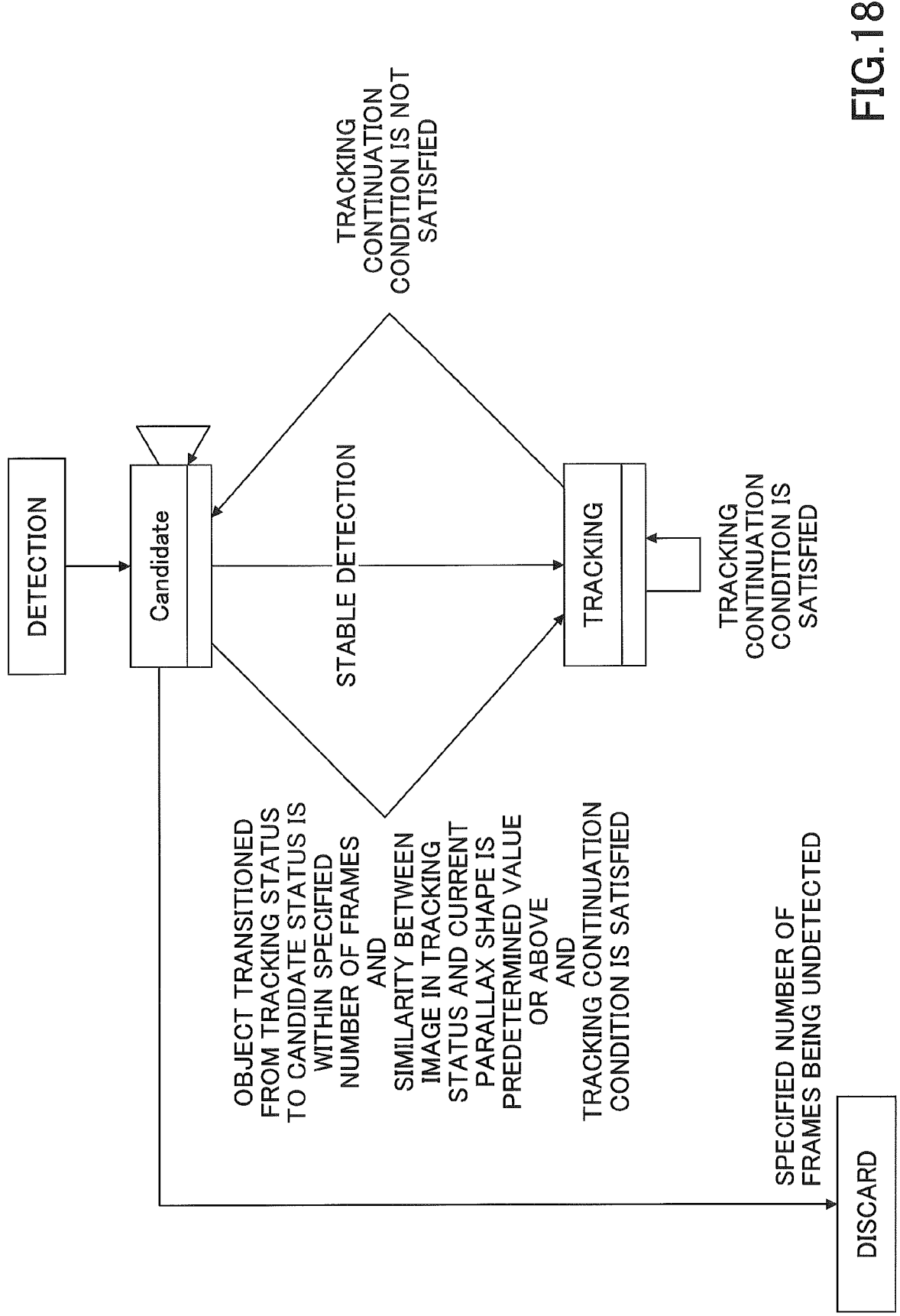
FIG. 18 is a diagram illustrating an example of transition of a tracking status of an object.

The tracking unit 1442 of the object tracking unit 144 manages a status relating to tracking accuracy of an object as "tracking status". With reference to FIG. 18, status transition of "tracking status" will be described. FIG. 18 is a diagram illustrating an example of status transition of a tracking status of an object.

First, when the tracking unit 1442 detects an object satisfying a predetermined condition such as being located within a predetermined range from a reference vehicle, the tracing unit 1442 saves data of the object in the object data list 146, and sets the data in the "candidate" status.

Then, when a predetermined condition such as stably detecting the object is satisfied in the "candidate" status, the tracking unit 1442 switches the "candidate" status to a "tracking" status. By contrast, when a predetermined condition such as not being continuously detected in a predetermined number of frames is satisfied in the "candidate" status, the tracking unit 1442 discards the data of the object from the object data list 146.

When the object in the "tracking" status does not satisfy a predetermined condition for being continuously tracked, the tracking unit 1442 makes a transition from the "tracking" status to the "candidate" status.

Figure 19:
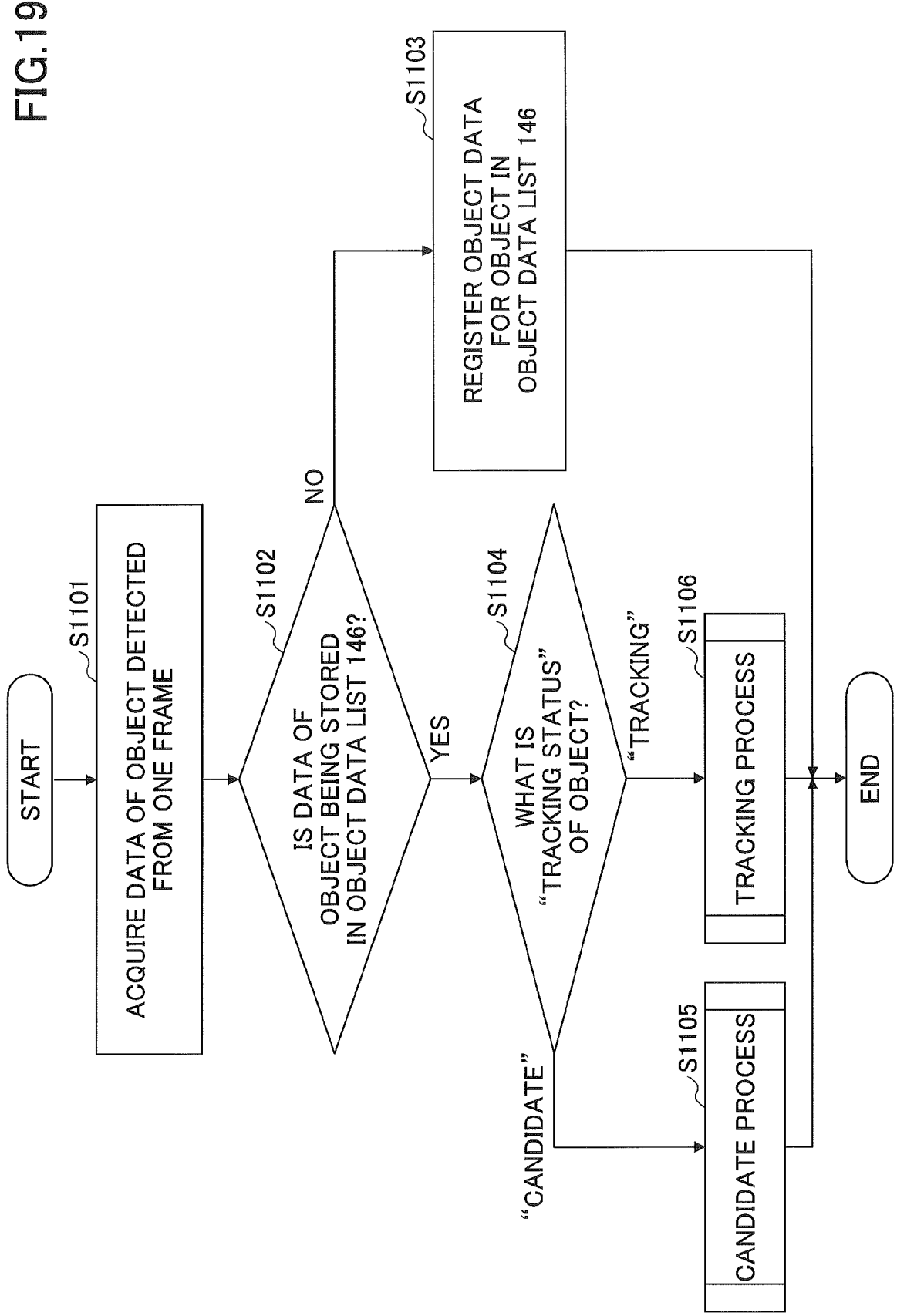
FIG. 19 is a flowchart illustrating an object tracking process.

Next, a process of tracking an object detected from a parallax image performed by the object tracking unit 144 will be described, with reference to FIG. 19. FIG. 19 is a flowchart illustrating an object tracking process performed by the object tracking unit 144.

The tracking unit 1442 of the object tracking unit 144 acquires data of an object detected from one frame imaged by a stereo camera (step S1101).

The tracking unit 1442 determines whether data corresponding to the object is stored in an object data list 146 (step S1102).

When the data corresponding to the object is not stored in the object data list 146 (NO in step S1102), the tracking unit 1442 updates the object data and object features with respect to the object in the object data list 146, registers data of the object in the object data list 146 (step S1103), and ends the process.

When data corresponding to the object is stored in the object data list 146 (YES in step S1102), the tracking unit 1442 determines the "tracking status" with respect to the object in the object data list 146 (step S1104).

When the "tracking status" is "candidate" ("candidate" in step S1104), the tracking unit 1442 performs a candidate process (step S1105), and ends the process. Note that details of the candidate process will be described later.

When the "tracking status" is "tracking" ("tracking" in step S1104), the tracking unit 1442 performs a tracking process (step S1106), and ends the process. Note that details of the tracking process will be described later.

Figure 20:
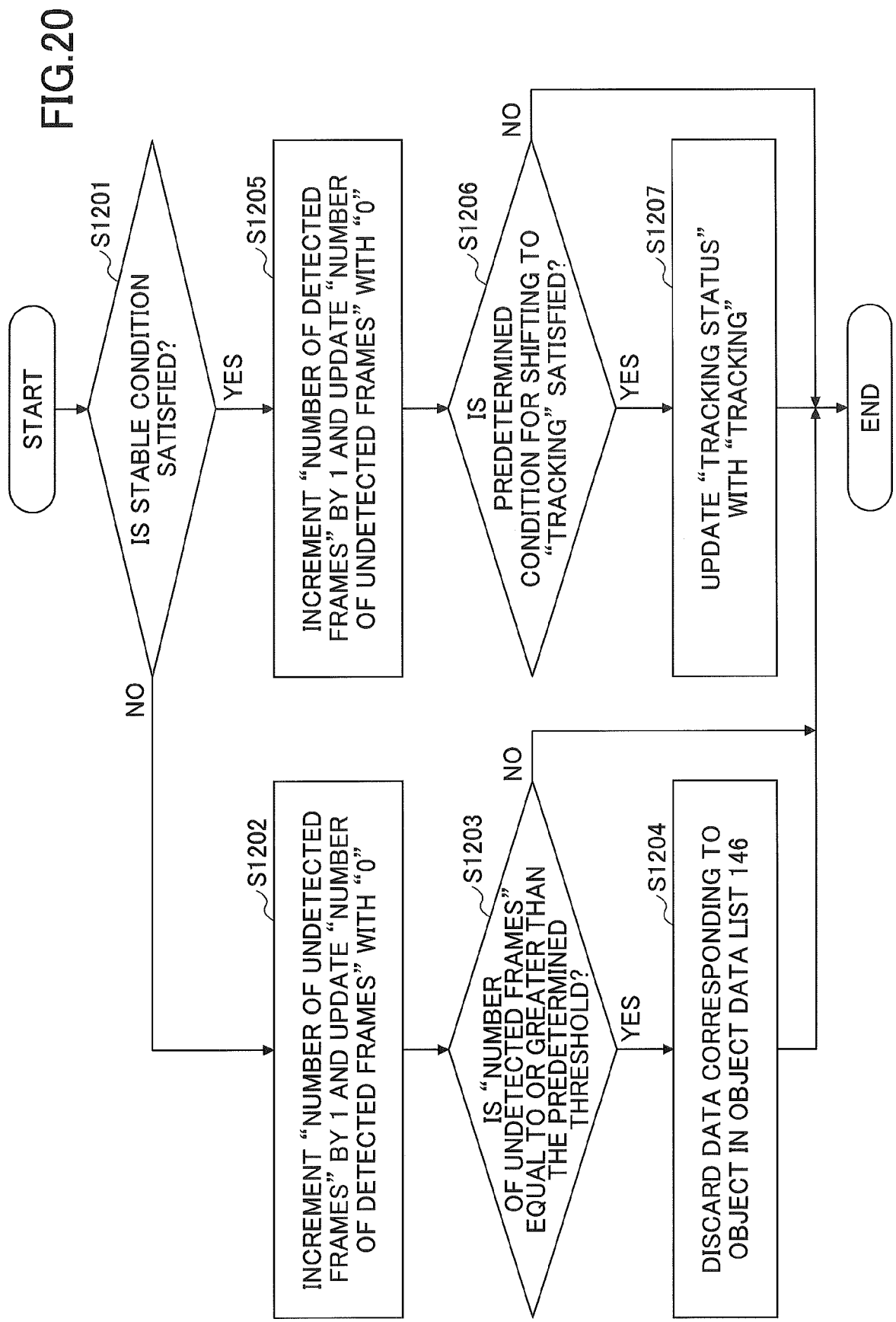
FIG. 20 is a flowchart illustrating a candidate process.

Next, with reference to FIG. 20, the process of tracking an object in the "candidate" status in step S1105 of FIG. 19 will be described. FIG. 20 is a flowchart illustrating a candidate process performed by the object tracking unit 144.

The tracking unit 1442 of the object tracking unit 144 determines whether an object detected in a current frame satisfies a stable condition (step S1201). Note that the stable condition may include a condition in which a region (a boxed part) including the object in the previous frame and a region including the object in the current frame overlap by half or more in both vertical and lateral directions.

When the stable condition is not satisfied (NO in step S1201), the tracking unit 1442 of the object tracking unit 144 increments the "number of undetected frames" corresponding to the object in the object data list 146 by 1, and updates the "number of detected frames" with "0" (step S1202).

The tracking unit 1442 determines whether "the number of undetected frames" is equal to or greater than a predetermined threshold value (e.g., 5) (step S1203). When the "number of undetected frames" is equal to or greater than the predetermined threshold value (YES in step S1203), the tracking unit 1442 discards data corresponding to the object in the object data list 146 (step S1204), and ends the process. As a result, the tracking frame will not be output to the display monitor 103 and the vehicle travel control unit 104.

When the "number of undetected frames" is not equal to or greater than the predetermined threshold value (NO in step S1203), the tracking unit 1442 ends the process.

When the stable condition is satisfied (YES in step S1201), the tracking unit 1442 of the object tracking unit 144 increments the "number of detected frames" corresponding to the object in the object data list 146 by 1, and updates the "number of undetected frames" to "0" (step S1205). The tracking unit 1442 determines whether the object in the object data list 146 satisfies a predetermined condition for shifting from "candidate" to "tracking" (step S1206).

The predetermined condition for shifting from "candidate" to "tracking" may, for example, be at least one of the following conditions. (1) The "number of detected frames" of the object in the object data list 146 is equal to or greater than a predetermined threshold value (e.g., 3). (2) An object transitioned from "tracking" to "candidate" is present within a number of frames corresponding to the predetermined threshold number of frames (e.g., 3). In addition, the predetermined condition for shifting from "candidate" to "tracking" may further need to satisfy a tracking continuation condition to be described later. In addition, the predetermined condition for shifting from "candidate" to "tracking" may further need to satisfy a condition where the similarity between the region including the object in the current frame and the region of the parallax image including the object when the object was in the "tracking" status at the latest instance is equal to or greater than the predetermined threshold value. Note that a specific example of the method of calculating similarity of images will be described later.

When the predetermined condition for shifting from "candidate" to "tracking" is satisfied (YES in step S1206), the tracking unit 1442 updates the "tracking status" of the object in the object data list 146 with "tracking" (step S1207) in order to set the object to be a tracking target, and ends the process. In this process, the object prediction data and the "image" of the tracking data with respect to the object in the object data list 146 may be updated.

When the predetermined condition for shifting from "candidate" to "tracking" is not satisfied (NO in step S1206), the tracking unit 1442 ends the process.

Next, a description is given of an example of a method of calculating a similarity of images in the predetermined condition for shifting from "candidate" to "tracking" in step S1206 of FIG. 20, which is performed by the tracking unit 1442.

The tracking unit 1442 calculates a feature amount of each image using a known method such as Higher-Order Local Auto Correlation (HLAC), Histogram of Oriented Gradient (HOG), or the like.

The HLAC is a method of extracting a feature of an image by expanding autocorrelation of the function $g(x, y)$ representing the density of the image by Nth order, and limiting the displacement $a_i$ and $b_i$ of $g(x, y)g(x+a_1, y+b_1) \ldots (x+a_N, y+b_N)$ to a local region around the reference pixel $(x, y)$. When the order of correlation is limited to the second order (three point correlation) and the displacement is limited to the local region of 3×3 pixels, a monochrome binary image, for example, will be a 25-dimensional pattern, and the pixel value indicated by this 25-dimensional pattern will be determined as a feature amount of the image.

HOG is a method of calculating an orientation histogram for each block region as a feature amount for an edge image calculated from an input image.

Then, the tracking unit 1442 compares the feature amounts of the two images to calculate the similarity between the two images. For example, the Euclidean distance between 25-dimensional feature amounts of two images calculated using HLAC or the like is calculated as the similarity between the two images.

Tracking Process

Figure 21:
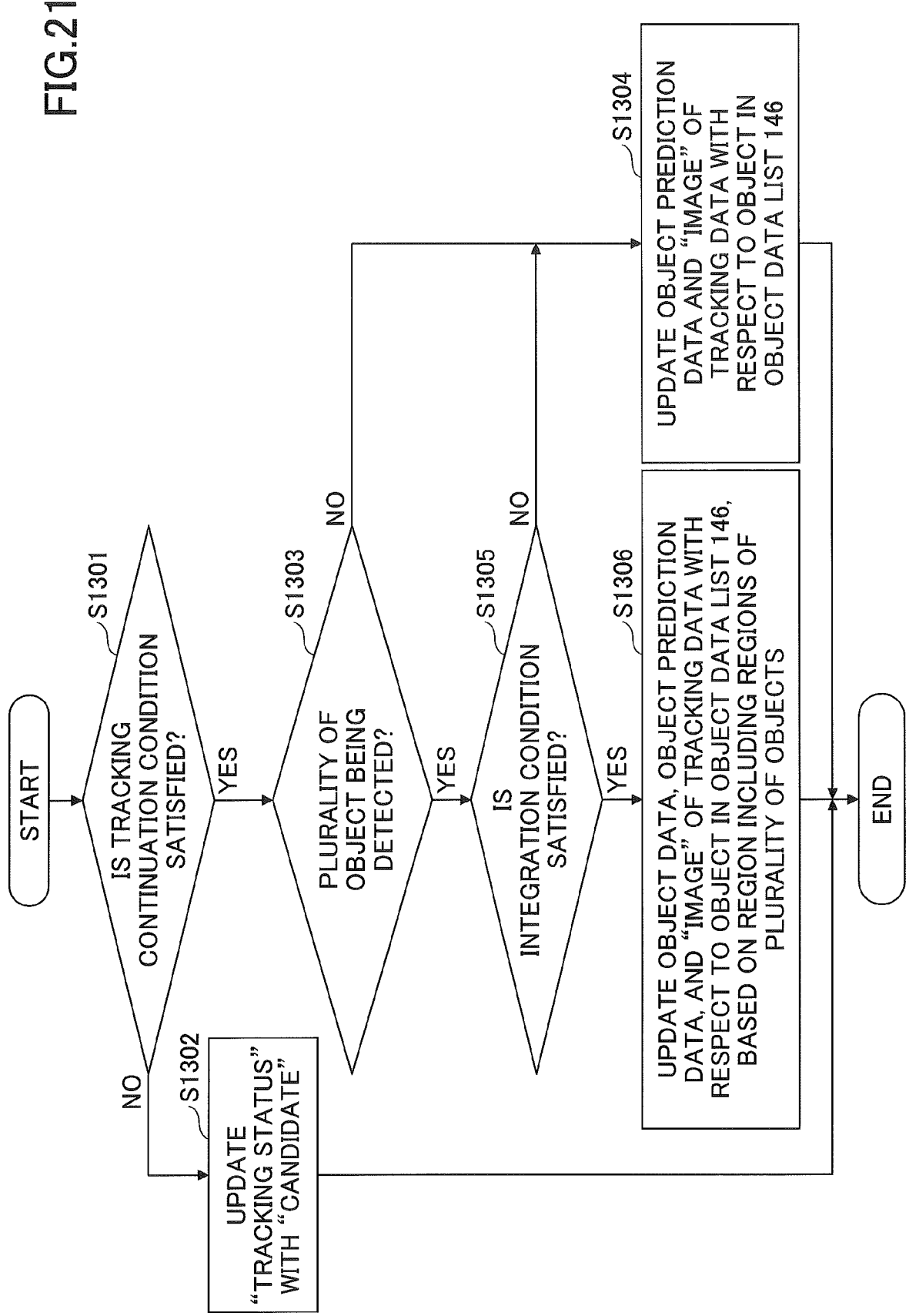
FIG. 21 is a flowchart illustrating an example of a tracking process, according to a first embodiment.

Next, with reference to FIG. 21, the process of tracking an object in the "tracking" status in step S1106 of FIG. 19 will be described. FIG. 21 is a flowchart illustrating an example of a tracking process according to the first embodiment.

The tracking unit 1442 of the object tracking unit 144 determines whether an object detected in the current frame satisfies the tracking continuation condition based on the real U map or the like generated by the real U map generator 138 (step S1301). Note that the tracking continuation condition may include the following conditions. The actual distance between the position (predicted position) of the object predicted from the previous frame and the position of the object generated based on the current frame is within a predetermined range (e.g., 2 m). In addition, when K represents a region including the detected object in the parallax image, L represents a region including the object in the parallax image that is predicted from the previous frame, and M represents a region where the region L and the region K overlaps, the ratio of an area M to an area of K and L is greater than a predetermined threshold S (e.g., 0.5). For example, Area M/{(Area K+Area L)/2}>S.

When the object does not satisfy the tracking continuation condition (NO in step S1301), the tracking unit 1442 updates the "tracking status" of the object with "candidate" in the object data list 146 (step S1302), and ends the process. In this process, the object prediction data of the object in the object data list 146 may be discarded. As a result, the tracking frame will not be output to the display monitor 103 and the vehicle travel control unit 104.

When the object satisfies the tracking continuation condition (YES in step S1301), the tracking unit 1442 determines whether a plurality of objects are detected by the object region extractor 141 within a predetermined range from a region corresponding to the predicted position of the object in the current frame (step S1303).

When the plurality of objects are not detected by the object region extractor 141 (NO in step S1303), the tracking unit 1442 updates the object prediction data and the "image" of the tracking data with respect to the object in the object data list 146 (step S1304), and ends the process. As a result, the tracking frame will be output to the display monitor 103 and the vehicle travel control unit 104.

When the plurality of objects are detected (YES in step S1303), the tracking unit 1442 determines whether the plurality of objects satisfy an integration condition (step S1305). Note that the integration condition is, for example, at least one of the following conditions. (1) The actual distance on the real U map between the plurality of objects is within a predetermined range (e.g., 1 m), and the difference between the relative velocities of the plurality of objects with respect to the reference vehicle is within a predetermined threshold value. (2) The regions of the plurality of objects detected by the object region extractor 141 are included in the region corresponding to the predicted position of the object in the current frame. And the actual distance between the predicted position of the object in the current frame and each of the actual positions of the plurality of objects detected by the object region extractor 141 on the real U map is within a predetermined range (e.g., 1 m).

Note that the actual distance between the objects on the real U map under the conditions of the above (1) and (2) may, for example, be calculated from the actual distance between the centers of regions of the objects on the real U map detected by the isolated region detector 139. Alternatively, the actual distance may be calculated from the actual distance between the positions where the frequency of the parallax values included in the region of the object on the real U map detected by the isolated region detector 139 is the highest.

When the plurality of objects does not satisfy the integration condition (NO in step S1305), the tracking unit 1442 of the object tracking unit 144 proceeds to step S1304. Note that the process in step S1304 may be performed, based on those of the plurality of objects having values of "position", "size", "distance", "relative velocity", and the like that are closer to the values included in the "object prediction data" in the object data list 146.

When the plurality of objects satisfy the integration condition (YES in step S1305), the tracking unit 1442 updates the object data, the object prediction data, and the "image" of the tracking data with respect to the object in the object data list 146, based on a region (e.g., a rectangular region or a square region) including regions of the plurality of objects in the current frame (step S1306), and ends the process. As a result, the "position", the "size", and the like of the object data are updated based on the region in which the plurality of objects are integrated, and the object prediction data may be calculated based on the updated object data.

Figure 22:
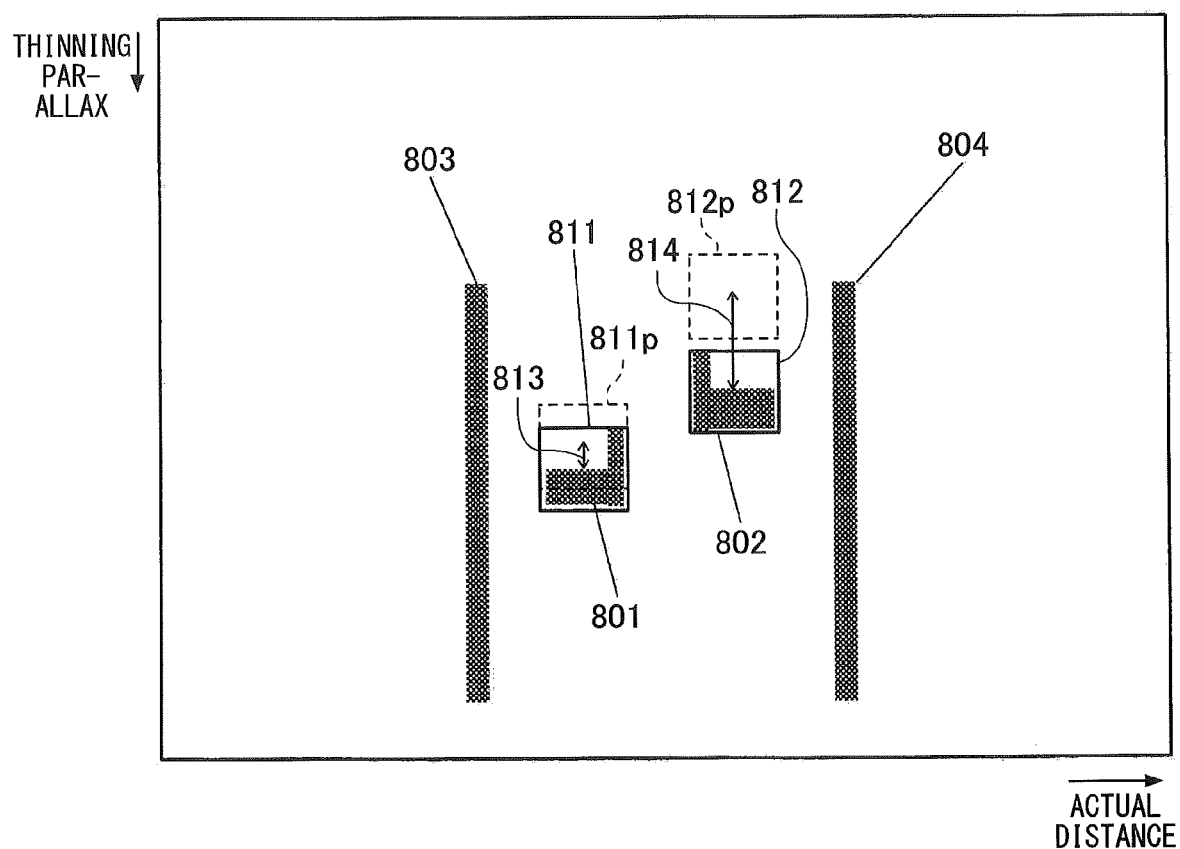
FIG. 22 is a diagram illustrating a process of calculating a relative velocity of an object.

Next, a description is given, with reference to FIG. 22, of a process of calculating the "relative velocity" of the object for calculating the predicted position performed by the position prediction unit 1441, which is used for the tracking continuation condition in step S1301 and the integration condition in step S1305 in FIG. 21. FIG. 24 is a diagram illustrating a process of calculating a relative velocity of an object.

In FIG. 22, broken lines represent respective positions of a first detection island 811p and a second detection island 812p in the previous frame with respect to the first detection island 811 and the second detection island 812 in the current frame in the example of the real frequency U map illustrated in FIG. 12. In this case, the relative velocity (moving distance per frame) of the first vehicle 801 with respect to the reference vehicle may be calculated from, for example, a distance 813 between the centers of 811 and 811p. Likewise, the relative velocity (moving distance per frame) of the second vehicle 802 with respect to the reference vehicle may be calculated from, for example, a distance 814 between the centers of 812 and 812p. Note that the position and the like of each object in the previous frame are stored in the object data list 146.

Note that the "relative velocity" may be configured to calculate the relative velocities in the preceding and succeeding frames a plurality of times and to use the mean of the relative velocities calculated the plurality of times. In such a case, when the calculation is performed more than a predetermined number of times (e.g., 5 times), a mean of the relative velocities calculated the plurality of times that excludes the maximum and minimum relative velocities may be used.

Figure 23A:
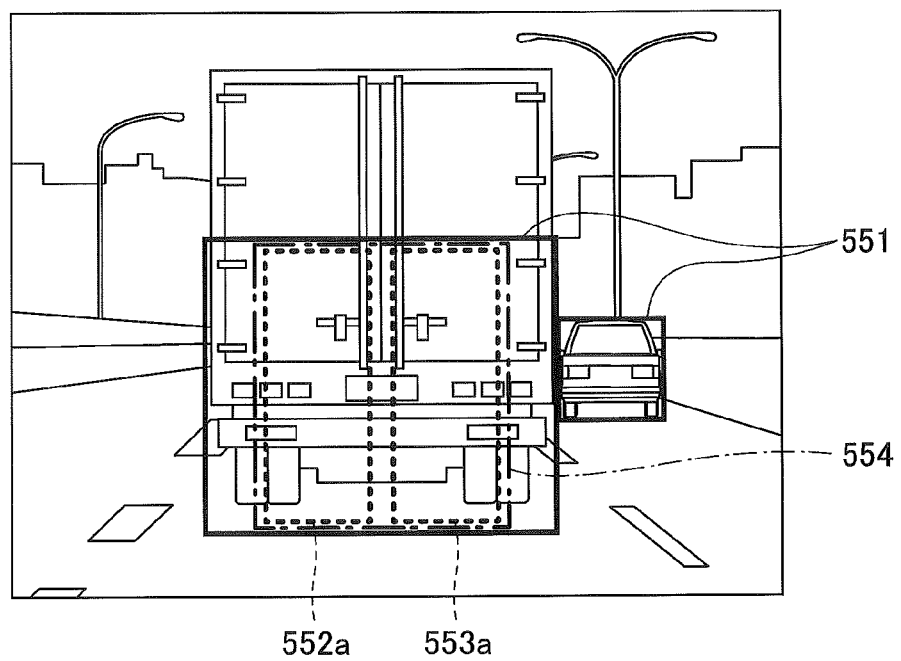
FIG. 23A is a diagram illustrating a process of calculating a region including regions of a plurality of objects.
Figure 23B:
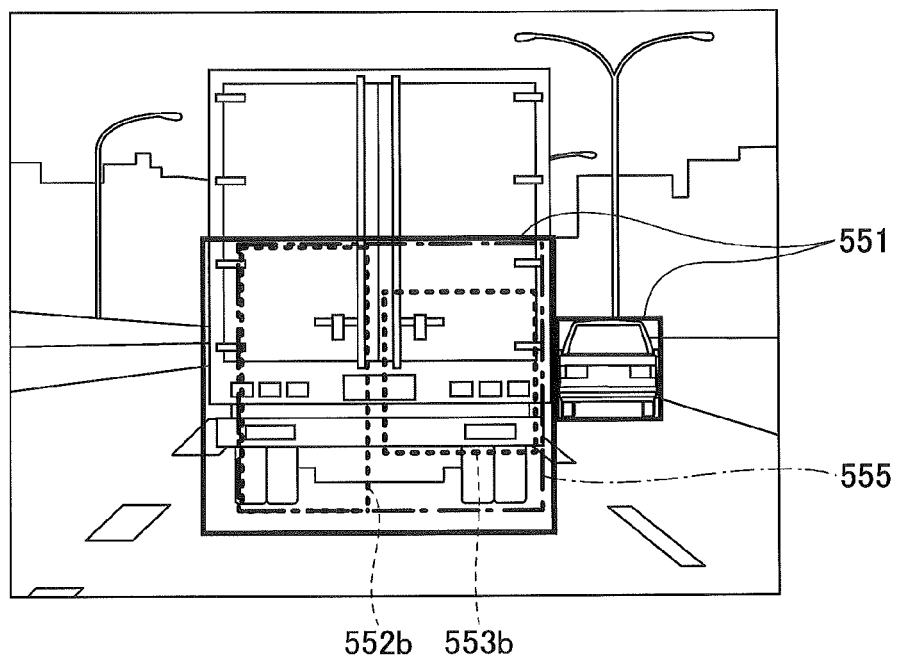
FIG. 23B is a diagram illustrating a process of calculating a region including regions of a plurality of objects.

Next, a description is given, with reference to FIGS. 23A and 23B, of a process of calculating a region including regions of a plurality of objects, which is performed by the tracking unit 1442 of the object tracking unit 144 in step S1306 of FIG. 21.

FIG. 23A and FIG. 23B are diagrams illustrating a process of calculating a region including regions of a plurality of objects. In the example of FIG. 23A, a region of one object is divided into left and right and detected as regions 552a and 553a of a plurality of objects. The tracking unit 1442 calculates a rectangle 554 having the smallest size including the regions 552a and 553a of the plurality of objects as a region including the regions of the plurality of objects.

In the example of FIG. 23B, a region of an object is divided into separate regions having inconsistent heterogeneous sizes, which are detected as respective regions 552b and 553b of a plurality of objects. The tracking unit 1442 calculates a rectangle 555 having the smallest size including the regions 552b and 553b of the plurality of objects as a region including the regions of the plurality of objects.

Next, an object selector 145 will be described.

The object selector 145 selects whether or not to track an object stored in the object data list 146, based on whether the object is at a position suitable for being tracked. More specifically, the object selector 145 sets a prediction range in the parallax image data including the predicted position of the object, based on the object prediction data in the object data list 146, and specifies the height of the object within the prediction range. The object selector 145 then refers to the object features in the object data list 146, specifies the width of the object from the specified height, and estimates the lateral (horizontal) position of the object on the parallax image data from the specified width. When the lateral position of the object estimated in this manner satisfies a predetermined tracking object condition (e.g., a highly reliable position where the object exists within the image, an appropriate position where the object is selected a tracking target, or the like), the object selector 145 selects the object as a tracking target. Note that the object selector 145 may delete data of an object not selected as a tracking target from the object data list 146.

Modification

In the integration condition (2) of step S1305 in FIG. 21 described above, the regions of the plurality of objects detected by the object region extractor 141 are included in the region corresponding to the predicted position of the object in the current frame. And, the actual distances between the predicted position of the object in the current frame and each of the actual positions of the plurality of objects detected by the object region extractor 141 on the real U map are within a predetermined range (e.g., 1 m).

Alternatively, a plurality of predicted positions may be used for a predicted position of the object in the current frame.

Figure 24A:
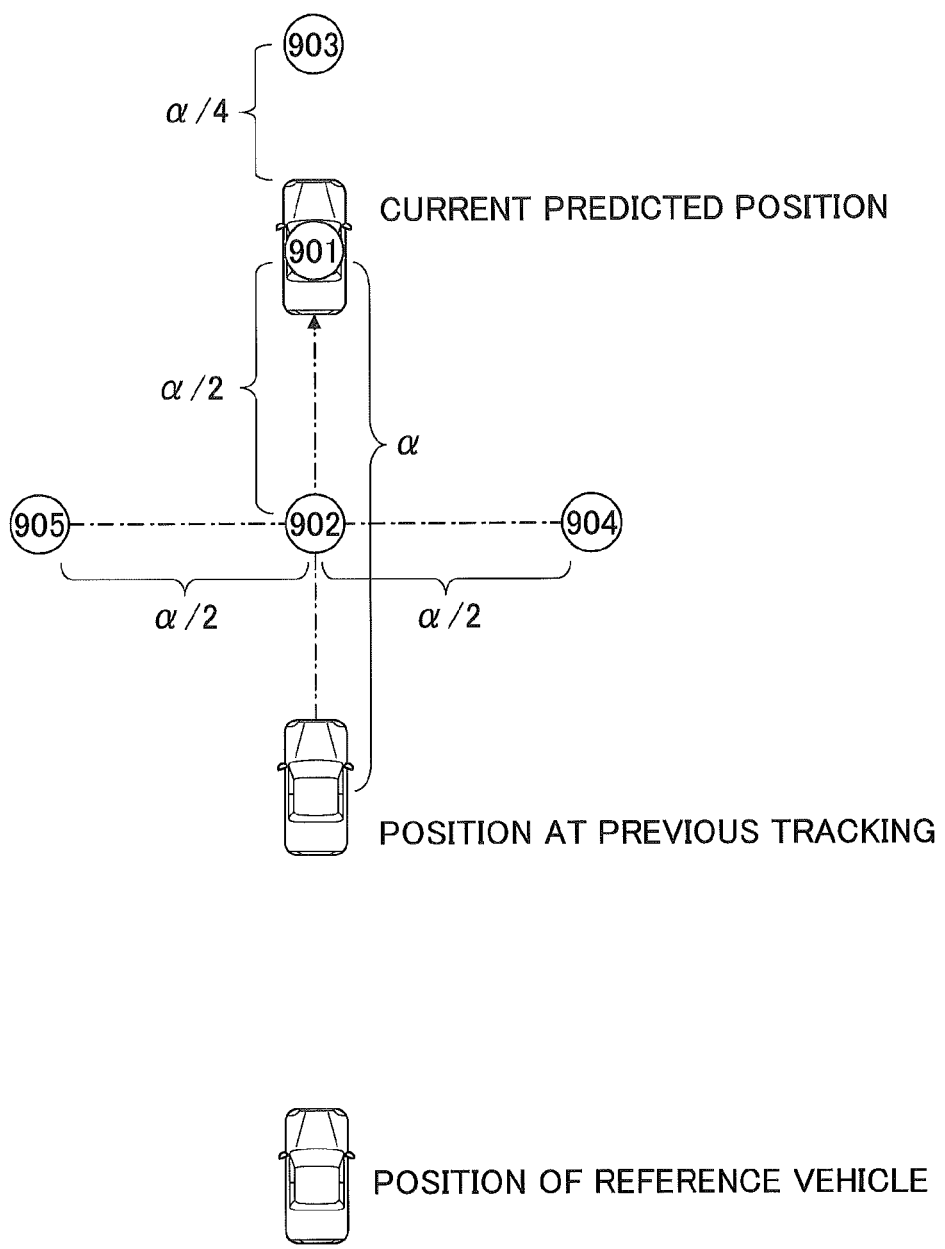
FIG. 24A is a diagram illustrating a process of calculating a candidate for a predicted position.
Figure 24B:
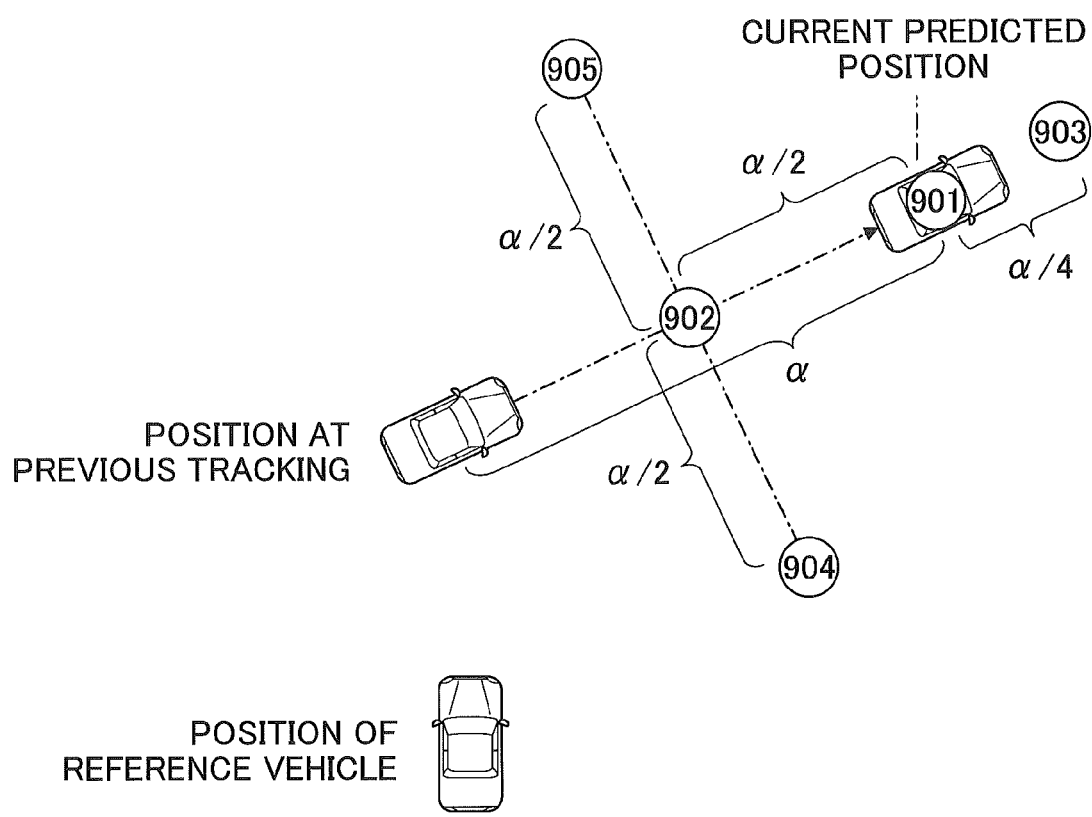
FIG. 24B is a diagram illustrating a process of calculating a candidate for a predicted position.

In this case, a process of calculating a plurality of predicted positions (candidates for predicted positions) of the object in the current frame will be described. FIGS. 24A and 24B are diagrams illustrating a process of calculating a candidate for a predicted position. FIG. 24A is a diagram illustrating an example of a preceding vehicle traveling in front of a reference vehicle at a higher velocity than the reference vehicle. FIG. 24B is a diagram illustrating an example of a preceding vehicle traveling in a right turn direction in front of the reference vehicle. The calculation process of a candidate for the predicted position is the same in both cases of FIGS. 24A and 24B.

First, the position prediction unit 1441 calculates, as a first predicted position 901, an actual position of the object in a lateral direction (horizontal direction) X and a depth direction (traveling direction) Z with respect to the reference vehicle in the current frame, based on the "number of estimations", "relative velocity" and "actual position" corresponding to the object in the object data list 146. For example, the first predicted position 901 may be determined to be a position calculated by adding a value obtained by multiplying the "relative velocity" by the "number of estimations" to a value of the "actual position".

Subsequently, the position predictor 1441 calculates, as a second predicted position, the actual position of the object with respect to the reference vehicle between the first predicted position 901 and the "actual position" corresponding to the object in the object data list 146. For example, the second predicted position 902 may be determined to be an intermediate position between the first predicted position 901 and the "actual position" corresponding to the object.

Subsequently, the position predictor 1441 determines, as a third predicted position 903, a position farther away from the "actual position" than the first predicted position 901 on a straight line connecting the first predicted position 901 and the "actual position". For example, the third predicted position 903 may be determined to be a position away from the first predicted position 901 by a quarter of the distance between the first predicted position 901 and the "actual position". The position prediction unit 1441 may determine, as a fourth predicted position 904 and a fifth predicted position 905, respective positions separate from the second predicted position 902, in a lateral (horizontal) direction, on a straight line perpendicular to a straight line that connects the first predicted position 901 to the "actual position" and that passes through the second predicted position 902. For example, the position prediction unit 1441 may determine the fourth predicted position 904 and the fifth predicted position 905 to be respective positions away from the second predicted position 902 by one half of the distance between the first predicted position 901 and the "actual position".

Subsequently, the position predictor 1441 determines the "actual position" as a sixth predicted position 906.

Subsequently, the position predictor 1441 performs processes similar to the corresponding region detector 140 and the object region extractor 141 described above to calculate a "position" and "size" of each region in pixel (coordinates) units of the object in the current frame, based on each of the first predicted position 901 to the sixth predicted position 906. This process will be described below with reference to FIGS. 25A and 25B.

Figure 25A:
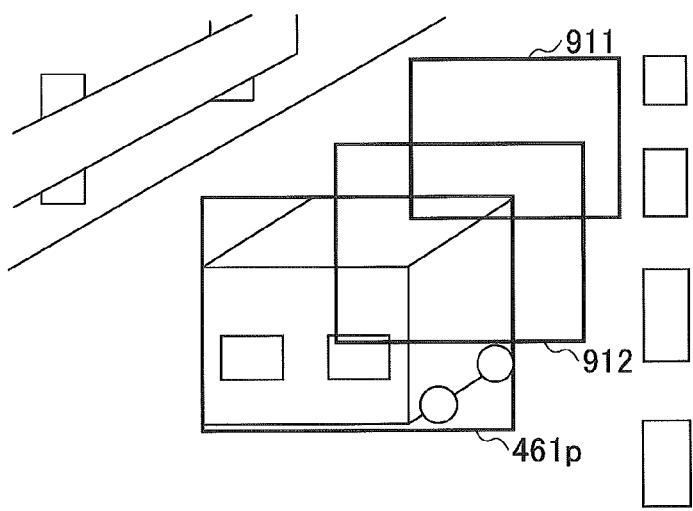
FIG. 25A is a diagram illustrating a process of calculating respective regions corresponding to a plurality of predicted positions.
Figure 25B:
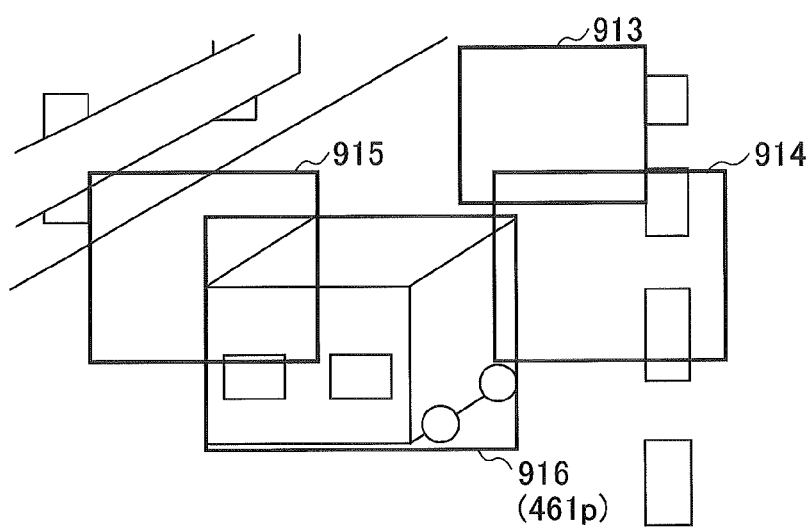
FIG. 25B is a diagram illustrating a process of calculating respective regions corresponding to a plurality of predicted positions.
Figure 26A:
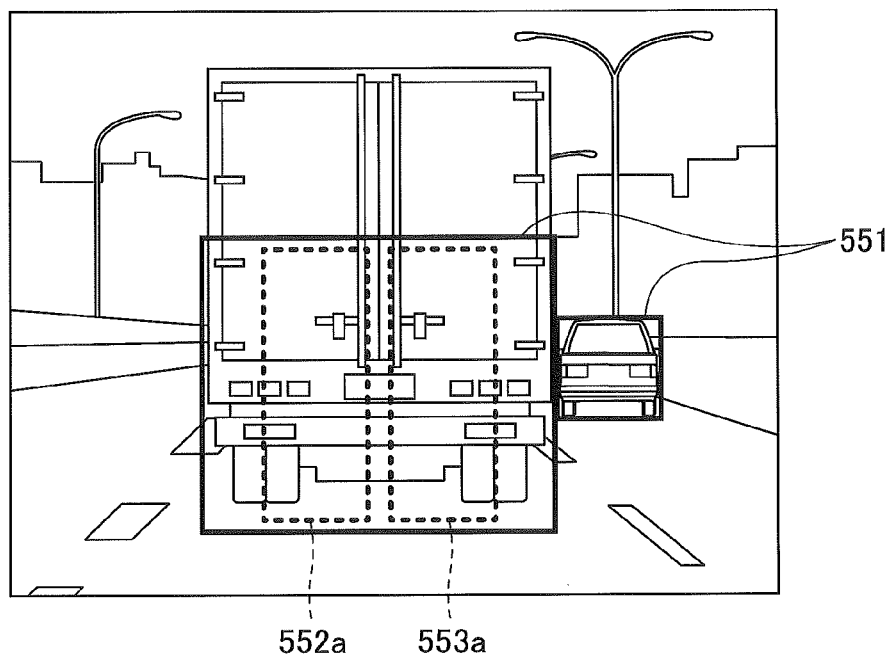
FIG. 26A is a diagram illustrating an example in the case where a region of one object of the related art technology is divided and detected.
Figure 26B:
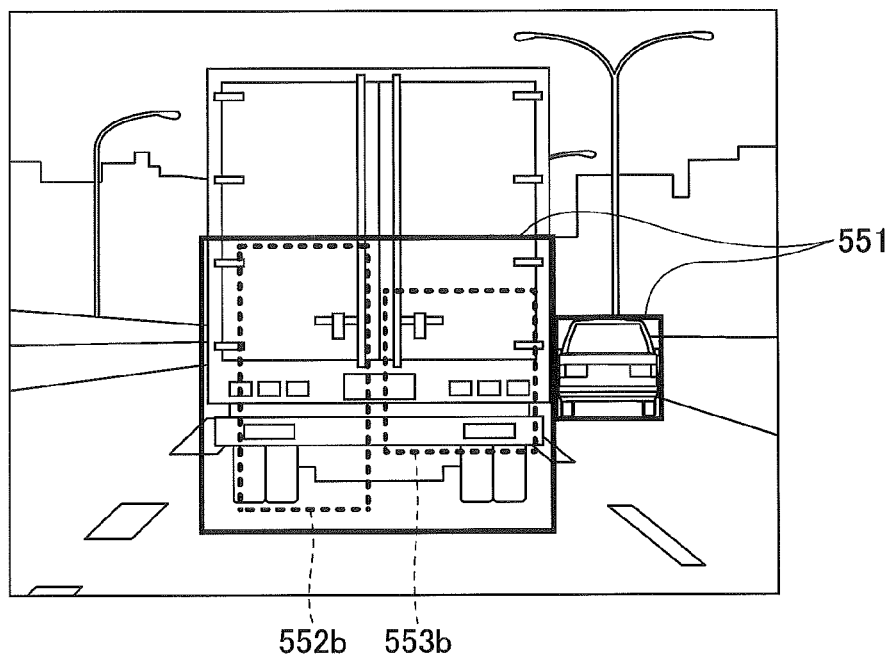
FIG. 26B is a diagram illustrating an example in the case where a region of one object of the related art technology is divided and detected.

FIGS. 25A and 25B are diagrams illustrating a process of calculating respective regions corresponding to a plurality of predicted positions in the current frame, which is performed by the position predictor 1441. FIG. 25A is a diagram illustrating examples of respective regions with respect to the first predicted position 901 and the second predicted position 902 when an object region 461p of the first vehicle is detected as illustrated in FIG. 14 in the previous (e.g., immediately previous) frame. As illustrated in FIG. 25A, in the case of a preceding vehicle traveling at a higher velocity than the reference vehicle, regions with respect to the first predicted position 901 and the second predicted position 902 are as illustrated by regions 911 and 912, respectively.

FIG. 25B is a diagram illustrating examples of respective regions with respect to the third predicted position 903 to the sixth predicted position 906 when the object region 461p of the first vehicle is detected as illustrated in FIG. 14 in the previous frame, in a manner similar to the examples in FIG. 25A. In a manner similar to the examples in FIG. 25A, in the case of a preceding vehicle traveling at a higher velocity than the reference vehicle, regions with respect to the third predicted position 903 to the sixth predicted position 906 are as illustrated by regions 913 to 916, respectively.

Second Embodiment

In the first embodiment, a description is given of an example of integrating a plurality of objects and tracking the integrated object when the integration condition is satisfied in step S1305 in the tracking process of FIG. 21.

In the second embodiment, a description is given of an example of tracking without integrating the plurality of objects when a background parallax (pixels) is present in a region integrating the regions of the plurality of objects despite the integration condition being satisfied in the tracking process. Since the second embodiment is the same as the first embodiment except a part thereof, a duplicated illustration is appropriately omitted.

Tracking Process

Next, with reference to FIG. 27, a process of tracking an object in the "tracking" status in step S1106 of FIG. 19 will be described. FIG. 27 is a flowchart illustrating an example of a tracking process according to the second embodiment.

Steps S2001 to S2005 and step S2007 are the same as steps S1301 to S1306 of FIG. 21 in the first embodiment, respectively.

When the plurality of detected objects satisfy the integration condition (YES in step S2005), the tracking unit 1442 of the object tracking unit 144 determines whether there is a background that is away from the plurality of objects by a predetermined distance or more, in a region (an integrated region) in which the plurality of objects are integrated (step S2006). Note that the process of determining whether there is a background will be described later.

When the background is included in the integrated region (YES in step S2006), the process proceeds to step S2004.

When the background is not included in the integrated region (NO in step S2006), the process proceeds to step S2007.

Figure 28:
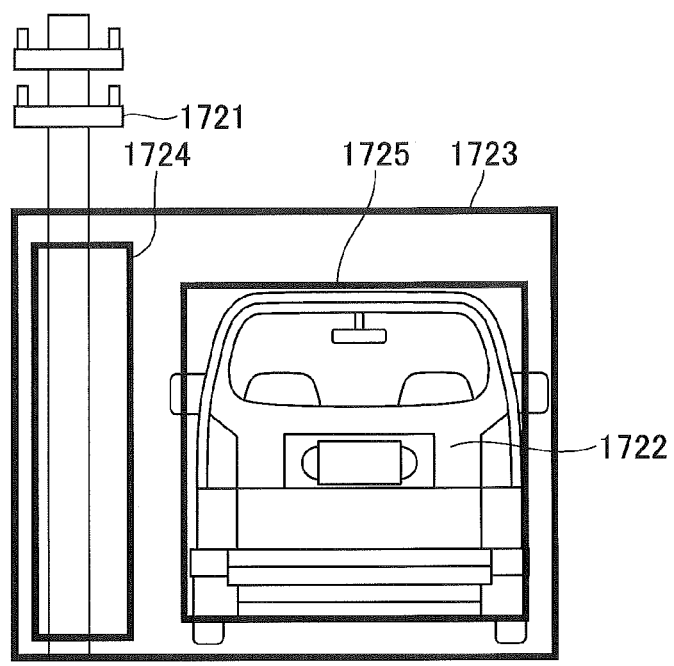
FIG. 28 is a diagram illustrating a tracking process according to the second embodiment.

FIG. 28 is a diagram illustrating a tracking process according to the second embodiment. In the previous frame, it is assumed that a side object 1721 such as a utility pole existing beside a road and a preceding vehicle 1722 are integrally detected by the process of step S2005. Then, it is assumed that a region 1724 of the side object 1721 and a region 1725 of the vehicle 1722 detected by the object region extractor 141 are included in a region 1723 corresponding to the predicted position of the integrated object in the current frame.

Also in this case, according to the second embodiment, the region 1724 of the side object 1721 and the region 1725 of the vehicle 1722 will be tracked by the process of step S2004 without integration by the process of step S2006.

Process of Determining Presence of Background

Figure 29:
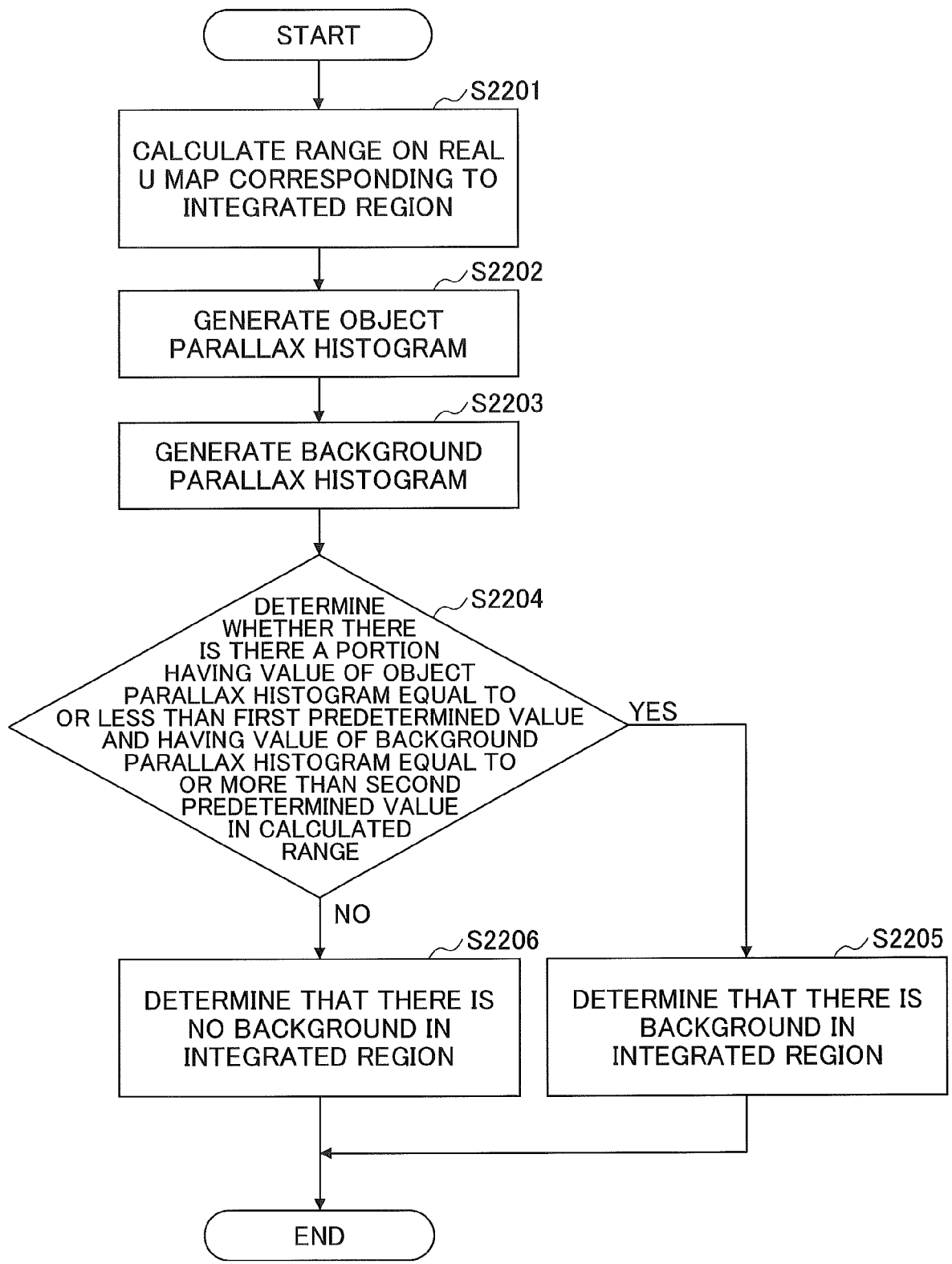
FIG. 29 is a flowchart illustrating an example of a process of determining whether there is a background parallax.

Next, with reference to FIG. 29, a process of determining whether there is a background parallax in step S2006 will be described. FIG. 29 is a flowchart illustrating an example of a process of determining whether there is a background parallax.

In step S2201, the tracking unit 1442 calculates a range on the real U map corresponding to a region in which a plurality of objects in the parallax image are integrated. In the case where the integrated region is located in the vicinity of the straight traveling direction of the reference vehicle, the range may be a range between the left end of the lateral coordinate and the right end of the lateral coordinate of the object region in the real U map of the object region corresponding to the integrated region. Alternatively, the range may be a range between two different straight lines connecting each of the centers of the imaging unit 110a and the imaging unit 110b to the parallax point of the object region on the real U map corresponding to the integrated region, where the different straight lines include a first straight line having the maximum angle with respect to the lateral direction and a second straight line having the smallest angle with respect to the lateral direction.

Subsequently, the tracking unit 1442 generates a histogram (hereinafter referred to as "object parallax histogram") indicating a total value of the parallax frequencies of the parallax points of the object region on the real U map corresponding to the integrated region in the calculated range (step S2202).

Subsequently, the tracking unit 1442 generates a histogram (hereinafter referred to as "background parallax histogram") indicating a total value of the parallax frequencies of the parallax points away from the object region by a predetermined distance or more on the real U map corresponding to the integrated region in the calculated range (step S2203).

Subsequently, the tracking unit 1442 determines whether there is a portion having a value of the object parallax histogram being equal to or less than a first predetermined value and having a value of the background parallax histogram being a second predetermined value or more in the range (step S2204).

When there is a relevant portion (YES in step S2204), the tracking unit 1442 determines that there is a background present in the integrated region (step S2205), and ends the process.

When there is no relevant portion (NO in step S2204), the tracking unit 1442 determines that there is no background present in the integrated region (step S2206), and ends the process.

Figure 30A:
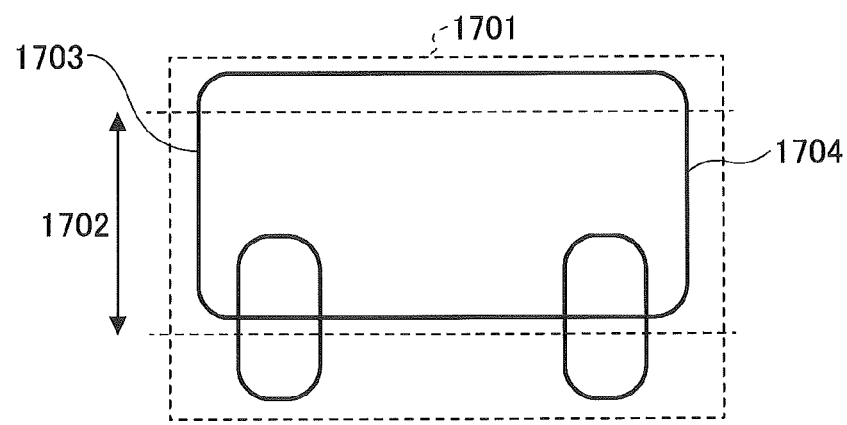
FIG. 30A is a diagram illustrating a background detection process in the case of an integrated region with respect to a region of an object such as a vehicle.
Figure 30B:
FIG. 30B is a diagram illustrating a background detection process in the case of an integrated region with respect to a region of an object such as a vehicle.
Figure 30C:
FIG. 30C is a diagram illustrating a background detection process in the case of an integrated region with respect to a region of an object such as a vehicle.

FIGS. 30A to 30C are diagrams illustrating a background detection process in the case of an integrated region with respect to a region of an object such as a vehicle. Of the integrated region 1701 with respect to the object region of the vehicle or the like in FIG. 30A, only the parallax points on the real U map existing in a predetermined height range 1702 may be used. In this case, as illustrated in FIG. 30B, the object parallax histogram 1705 has a total value of the parallax frequency that is increased in portions corresponding to the vicinities of both ends 1703 and 1704 of the vehicle or the like. In addition, in this case, since an object farther from the object such as a vehicle is blocked by the object such as the vehicle and is thus not imaged, the background parallax histogram 1706 indicates that, as illustrated in FIG. 30C, there is almost no total value of the parallax frequency. In this case, in step S2206, the tracking unit 1442 determines that that there is no background in the integrated region.

Figure 31A:
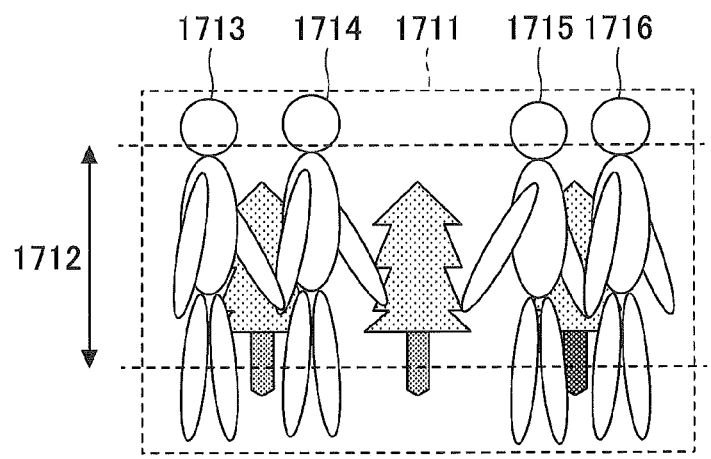
FIG. 31A is a diagram illustrating a background detection process in the case of an integrated region with respect to an object region in which two groups such as pedestrians are coupled.
Figure 31B:
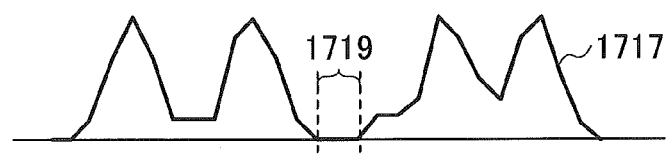
FIG. 31B is a diagram illustrating a background detection process in the case of an integrated region with respect to an object region in which two groups such as pedestrians are coupled.
Figure 31C:
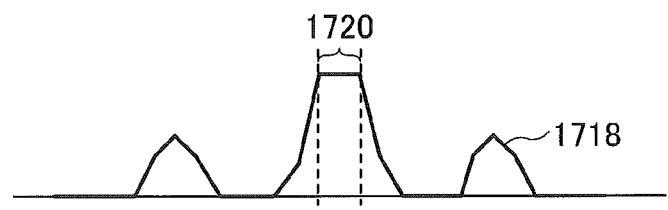
FIG. 31C is a diagram illustrating a background detection process in the case of an integrated region with respect to an object region in which two groups such as pedestrians are coupled.

FIGS. 31A to 31C are diagrams illustrating a background detection process in the case of an integrated region with respect to an object region in which two groups of pedestrians or the like are coupled. In the manner similar to the case of FIG. 15, of the integrated region 1711 with respect to the object region in FIG. 31A, only the parallax points on the real U map existing in a predetermined height range 1712 may be used. In this case, as illustrated in FIG. 31B, the object parallax histogram 1717 has a total value of the parallax frequency that is increased in portions corresponding to the vicinity of each pedestrian 1713, 1714, 1715, 1716, or the like. Further, in this case, an object farther than the objects such as pedestrians and the like may also be imaged from a gap between pedestrians and the like. Therefore, as illustrated in FIG. 31C, the background parallax histogram 1718 includes a portion 1720 having a value of the background parallax histogram being a predetermined value or more in a portion 1719 (FIG. 31B) that includes almost no value of the object parallax histogram. In this case, in step S2205, the tracking unit 1442 determines that that there is a background in the integrated region.

Third Embodiment

In the first embodiment, an example in which a plurality of objects are integrated and tracked in the tracking process of FIG. 21 has been described.

According to the third embodiment, an example of a method of calculating a distance from the reference vehicle to the integrated object when the plurality of objects are integrated in the tracking process will be described. Note that since the third embodiment is the same as the first embodiment or the second embodiment except a part thereof, a duplicated illustration is appropriately omitted.

Tracking Process

Figure 32:
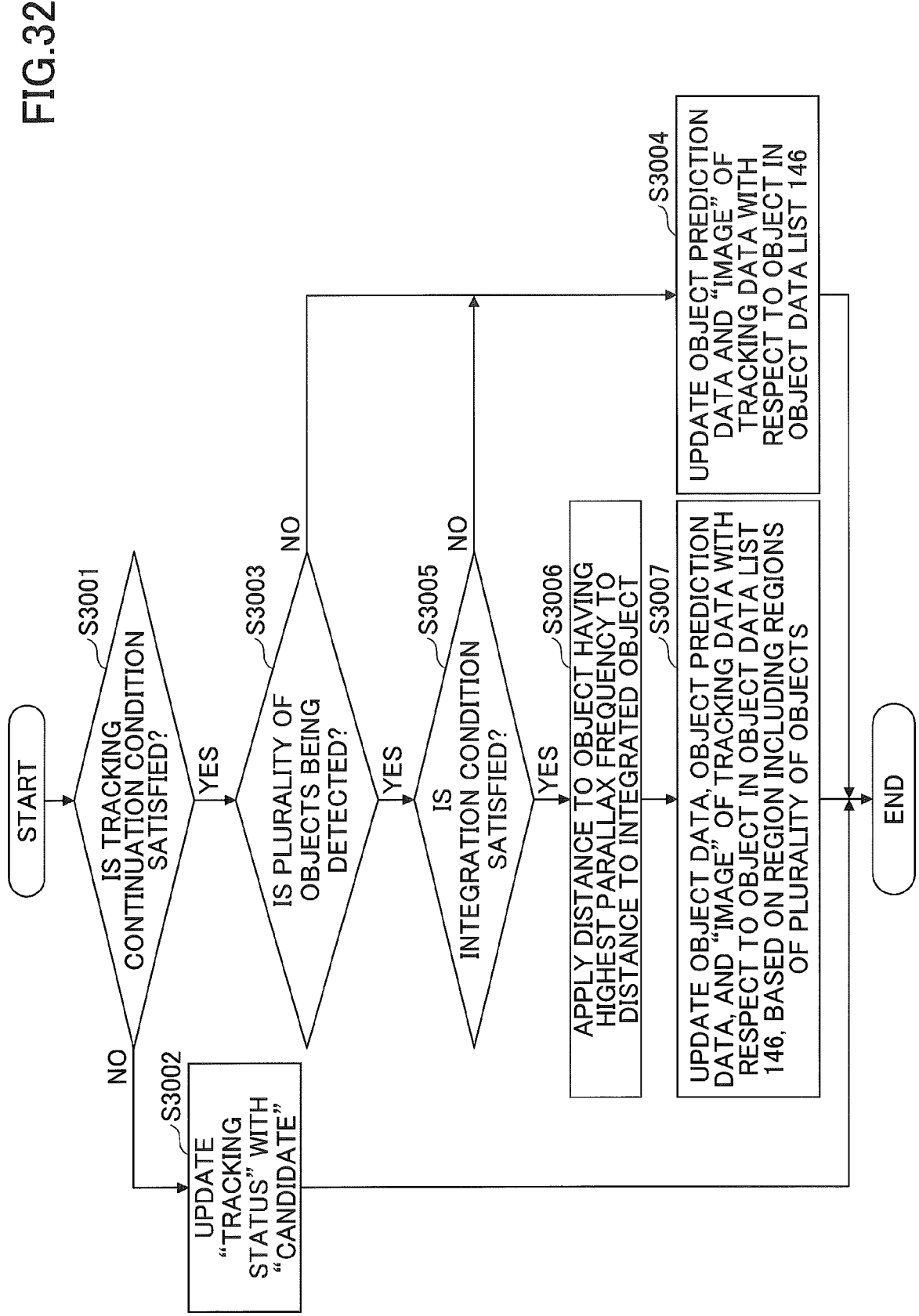
FIG. 32 is a flowchart illustrating an example of a tracking process, according to a third embodiment.

Next, with reference to FIG. 32, a process of tracking an object in the "tracking" status in step S1106 of FIG. 19 will be described. FIG. 32 is a flowchart illustrating an example of a tracking process according to the third embodiment.

Steps S3001 to S3005 and step S3007 are the same as steps S1301 to S1306 of FIG. 21 in the first embodiment, respectively.

When a plurality of detected objects satisfy the integration condition (YES in step S3005), the tracking unit 1442 of the object tracking unit 144 sets a distance from a reference vehicle to an object having the highest parallax frequency of the parallax points (an object having a parallax point with the highest parallax frequency or an object having the largest number of pixels having a parallax value), among the plurality of objects, as a distance from the reference vehicle to a region including regions of the plurality of objects (step S3006). As a result, the distance from the reference vehicle to one of the plurality of objects having the parallax point with the highest parallax frequency is set as a distance from the reference vehicle to the integrated object in which the plurality of objects are integrated.

In this case, when the object region extractor 141 detects the plurality of objects, the object region extractor 141 may store a parallax point with the highest parallax frequency in each object. This may make it unnecessary to search for a parallax point with the highest parallax frequency of parallax points in the integrated region after integrating the plurality of objects.

Figure 33A:
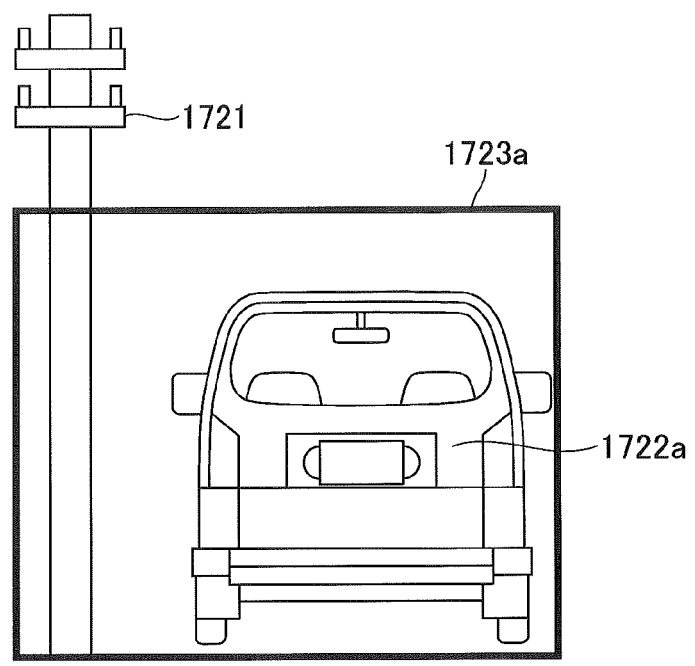
FIG. 33A is a diagram illustrating a tracking process according to the third embodiment.
Figure 33B:
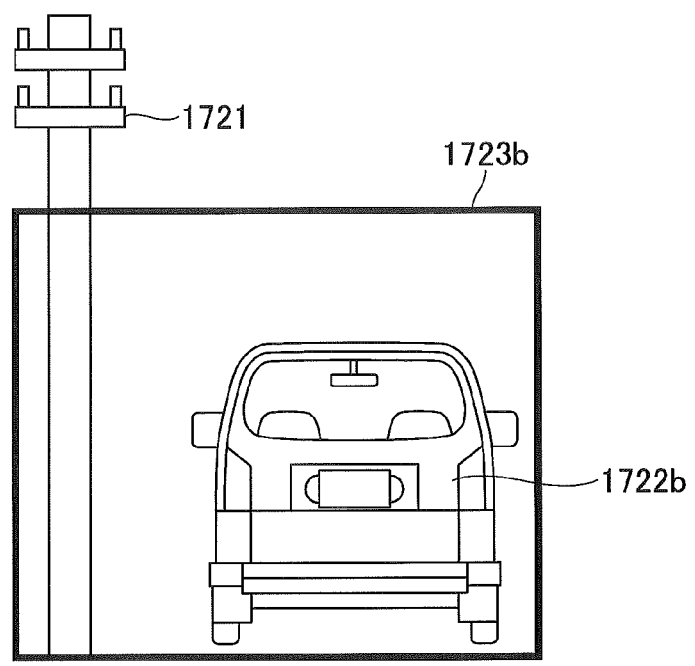
FIG. 33B is a diagram illustrating a tracking process according to the third embodiment.
Figure 33C:
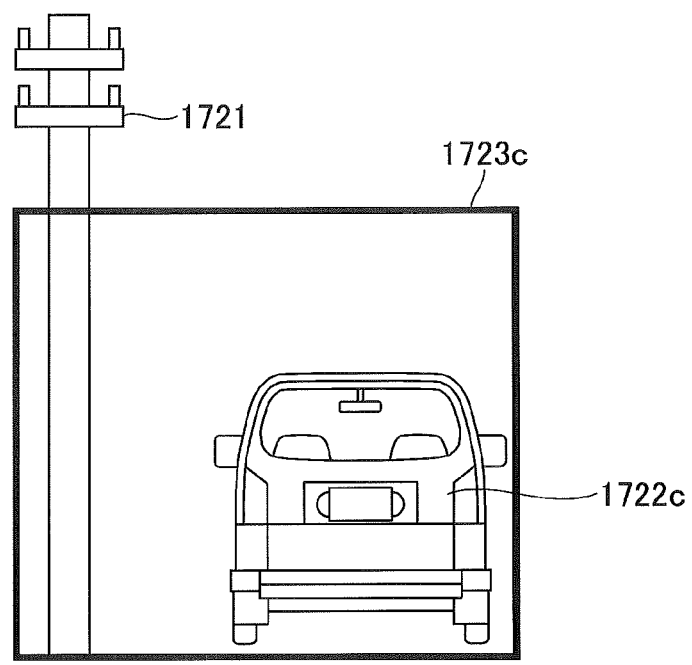
FIG. 33C is a diagram illustrating a tracking process according to the third embodiment.

FIGS. 33A to 33C are diagrams illustrating a tracking process according to the third embodiment. In the examples of FIGS. 33A to 33C, it is assumed that in each of the frame before the previous frame, the previous frame, and the current frame, a side object 1721 existing on the roadside such as a utility pole and the preceding vehicles 1722a to 1722c are integrated by the process of step S2007 and the integrated regions 1723a to 1723c are detected. Then, it is assumed that in each of the frame before the previous frame, the previous frame, and the current frame, a distance from the reference vehicle to the side object 1721 is constant and respective distances from the reference vehicle to the preceding vehicles 1722a to 1722c gradually increases. In this case, when a shorter one of the distances to the object from the reference vehicle is used as the distance of the integrated object, the integrated objects may be determined not to be moving away from the reference vehicle despite the fact that the preceding vehicles 1722a to 1722c gradually move away from the reference vehicle. However, according to the third embodiment, since the distance to the object having the highest parallax frequency of the parallax points is used as a distance of the integrated object, the integrated objects are determined to move away as the preceding vehicles 1722a to 1722c move away.

Modification

In step S3006, a distance to an object having the highest parallax frequency with relatively large weights among the plurality of objects in the region in the traveling direction of the reference vehicle may be a distance from the reference vehicle to a region including respective regions of the plurality of objects. This is because the side object such as a utility pole that does not exist in the traveling direction of the reference vehicle does not affect the traveling of the reference vehicle.

In addition, in step S3006, the mean of the distances from the reference vehicle to the plurality of objects, which is weighted according to the total value of the parallax frequencies of the parallax points included in the plurality of objects, may be applied to a distance from the reference vehicle to the region including the regions of the plurality of objects.

Fourth Embodiment

According to the first embodiment, in an example of the tracking process illustrated in FIG. 21, after integrating a plurality of objects, data on a region including the plurality of integrated objects is stored in the step S1306, and tracking is subsequently conducted.

According to the fourth embodiment, after integrating a plurality of objects, data on a region including the plurality of integrated objects, and data on respective regions of the objects before integration are stored. Then, a region including a plurality of objects and respective regions of a plurality of objects detected in a current frame are compared with the integrated region of the plurality of objects and respective regions of the plurality of objects before integration in a previous frame, respectively. In a case where a degree of overlap between the current frame and the previous frame for a region of the plurality of objects is higher than a degree of overlap between the current frame and the previous frame for an integrated region including regions of a plurality of objects, the region including the plurality of the objects detected in the current frame is split into separate regions of the respective objects, and tracking is performed on the separated regions of the objects. According to the fourth embodiment, since data of the integrated region including a plurality of objects and data of each of the regions of the plurality of objects in the previous frames are stored, the objects will be correctly detected in subsequent frames. Thus, even if a plurality of separate objects are integrated into one region, and data of the integrated objects in one integrated region is stored, it is possible to correctly track each of the objects.

Note that since the fourth embodiment is the same as the first to the third embodiments except a part thereof, a duplicated illustration is appropriately omitted.

Tracking Process

Figure 34:
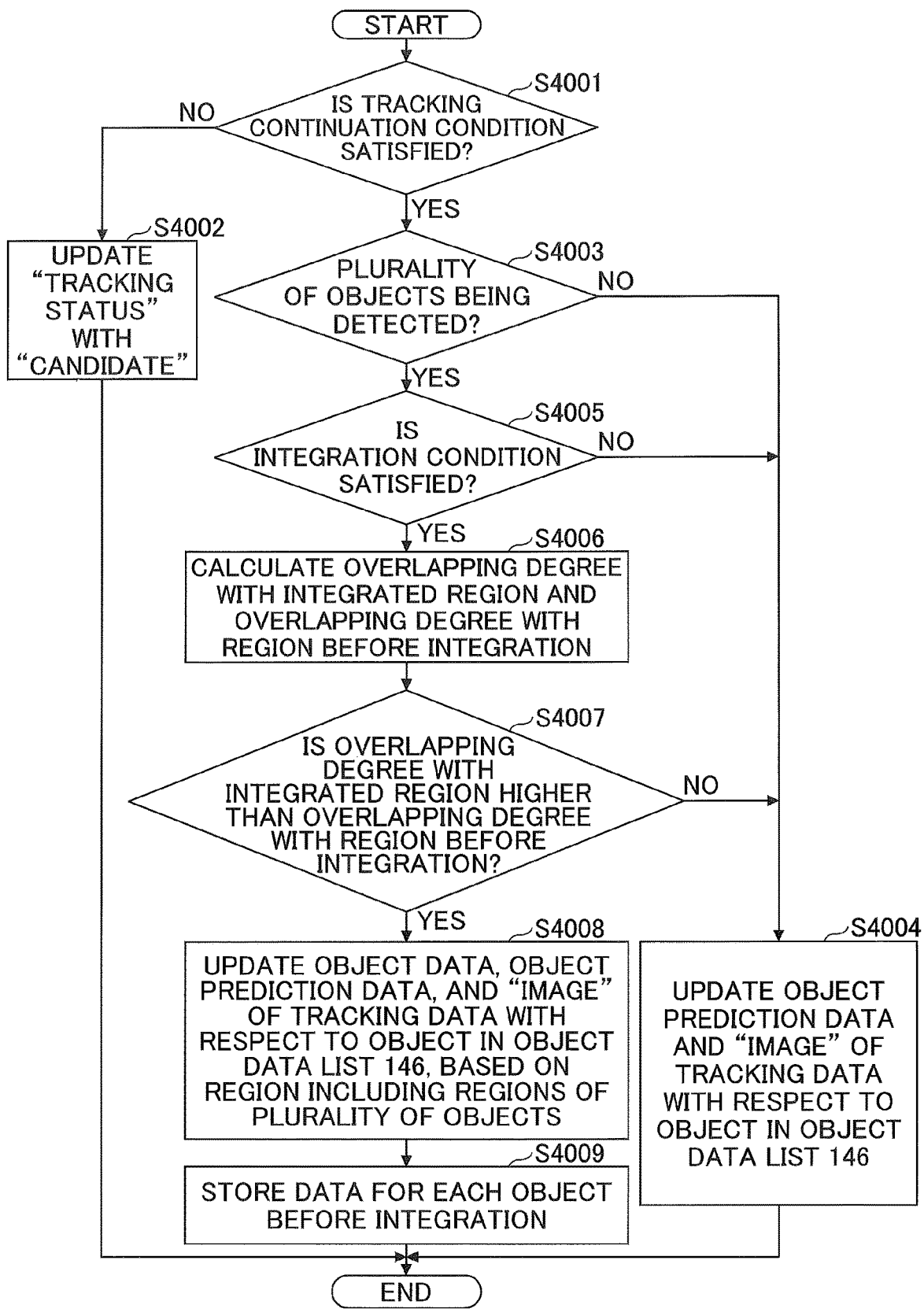
FIG. 34 is a flowchart illustrating an example of a tracking process, according to a fourth embodiment.

Next, with reference to FIG. 34, a process of tracking an object in the "tracking" status in step S1106 of FIG. 19 will be described. FIG. 34 is a flowchart illustrating an example of a tracking process according to the fourth embodiment.

Steps S4001 to S4005 and step S4008 are the same as steps S1301 to S1306 of FIG. 21 in the first embodiment, respectively.

When a plurality of detected objects satisfy the integration condition (YES in step S4005), the tracking unit 1442 of the object tracking unit 144 calculates the degree of overlap for the region including the plurality of integrated objects and the degree of overlap for the region of each object before integration, with respect to the regions of the plurality of objects detected in subsequent frames (step S4006).

Here, the degree of overlap may be calculated based on at least one of the overlapping ratio and the distance between the regions of the two objects to be compared. Note that it is assumed that K represents one of regions of the two objects to be compared, L represents the other region, and M represents the region common to the two regions, such that the overlapping ratio may be calculated by the following formula.

Overlapping Ratio=Area$M$/(Area $K$+Area $L$−Area $M$)

The distance is a distance between two objects in real space. For an object obtained by integrating a plurality of objects, the mean of distances for the plurality of objects may be used. For calculating the regional degree of overlap using both the overlapping ratio and distance, predetermined weighting may be applied to each of the regional overlapping ratio and distances (multiplied by a predetermined weighting coefficient) with summation thereof.

Subsequently, the tracking unit 1442 of the object tracking unit 144 determines whether the degree of overlap for the region including the plurality of integrated objects is higher than the degree of overlap for the region of each object before integration (step S4007).

When the degree of overlap for the region including the plurality of integrated objects is not higher (NO in step S4007), the process proceeds to step S4004.

When the degree of overlap for the region including the plurality of integrated objects is higher (YES in step S4007), in step S4008, as in step S1306, the tracking unit 1442 of the object tracking unit 144 stores data on a region including the plurality of integrated objects.

Subsequently, the tracking unit 1442 of the object tracking unit 144 stores data on each object before integration (step S4009). Note that items of data to be stored in step S4008 may be the same as the items of data to be stored in step S4004 (step S1304).

A plurality of object regions, which are originally targeted to be integrated, have characteristics that the size and position are likely to fluctuate in subsequent frames, compared with a plurality of object regions detected with respect to separate objects (e.g., different vehicles stopped side-by-side). Therefore, in the fourth embodiment, when the degree of overlap for a region including multiple integrated objects is relatively low, the multiple integrated objects are separated, and tracking is performed on the separate objects.

Fifth Embodiment

In the first embodiment, a description is given of an example of integrating a plurality of objects and tracking the integrated object when the integration condition is satisfied in step S1305 in the tracking process of FIG. 21.

In a fifth embodiment, an example of integrating a plurality of objects and tracking the integrated object will be described even when an integration condition different from the predetermined integration condition is satisfied. The different integration condition is, for example, that the traveling velocity of the reference vehicle and the traveling velocity of a tracking target object are equal to or higher than a predetermined velocity. For example, when separated regions are detected with respect to a tracking target object that is a truck having a monochromatic back surface to reflect light, the separate regions are integrated and tracking is performed on an integrated region.

Note that since the fifth embodiment is the same as the first to the fourth embodiments except a part thereof, a duplicated illustration is appropriately omitted.

Tracking Process

Next, with reference to FIG. 35, a process of tracking an object in the "tracking" status in step S1106 of FIG. 19 will be described. FIG. 35 is a flowchart illustrating an example of a tracking process according to the fifth embodiment.

Steps S5001 to S5004 and step S5006 are the same as steps S1301 to S1306 of FIG. 21 in the first embodiment, respectively.

When a plurality of objects are detected by the object region extractor 141 within a predetermined range from the region corresponding to the predicted position of the object in the current frame (YES in step S5003), the tracking unit 1442 of the object tracking unit 144 determines whether the plurality of objects satisfy a second integration condition (step S5005).

Note that the second integration condition may, for example, includes a condition in which the reference vehicle and the plurality of objects are traveling at a predetermined velocity (e.g., 20 km/h), and other conditions such as a condition in which objects are integrated easier than the first integration condition. For example, in a case where a first integration condition is a condition based on the actual distance between the plurality of objects, the predicted position of the object, the above-described overlapping ratio of the region and the like, a value for a threshold for determining whether to satisfy the second integration condition may be more moderate than a threshold for determining whether to satisfy the first integration condition.

Note that a case where the second integration condition is not satisfied and the first integration condition is satisfied indicates a case where although the condition relating to the overlapping ratio or the like is satisfied, the condition relating to the traveling velocity is not satisfied.

In the fifth embodiment, in a case where the tracking target is a vehicle such as a truck, both the reference vehicle and the target vehicle are stably traveling at a relatively high velocity, and regions of the plurality of extracted objects are within a region integrated in the previous frame or the overlapping ratio of the regions is equal to or greater than a predetermined threshold, the region integrated in the previous frame or the region integrating the plurality of objects in the current frame is stored in the object data list 146, and tracking is performed thereafter. That is, when the reference vehicle is traveling at a velocity equal to or higher than a first threshold value and the target vehicle is traveling at a velocity equal to or higher than the second threshold value (which may be the same as the first threshold value), the second integration condition that is easier to integrate than the first integration condition and has a setting of a threshold relating to the overlapping ratio lower than the first integration condition is used. This is because, when both the reference vehicle and the target vehicle are stably traveling at a relatively high velocity, there would be a low possibility that an object separate from the tracking target object appears suddenly near the tracking target object.

When the second integration condition is not satisfied (NO in step S5005), the process proceeds to step S5006, the tracking unit 1442 determines whether to satisfy the integration condition (first integration condition) as in the process of step S1305.

When the second integration condition is satisfied (YES in step S5005), the process proceeds to step S5007.

Note that the configurations and processes described in the above embodiments may be appropriately combined.

Overview

In the related art technology, when an object ahead of a reference vehicle is tracked and the tracking object is a truck having a white or silver back side and having doors with a plurality of black patterns in the vertical direction or the like, the tracking object may be erroneously detected as a plurality of separate objects along the black patterns. Further, when the tracking object, for example, enters into a dark tunnel to receive illumination light from the left and right, such that only the left and right sides of the tracking object are bright, or when the tracking object turns on its headlight at night, the tracking object may be erroneously detected as a plurality of objects separated into right and left.

In the above cases, when the predetermined condition for continuing the tracking is no longer satisfied, tracking in the next frame fails to be performed. This is a problem unique to tracking using a stereo camera, which will not occur, for example, in tracking using millimeter wave radar or laser radar.

According to the above-described embodiments, even when the tracking target object is erroneously detected as a plurality of objects, the plurality of objects may be integrated based on the predicted position of the object in the parallax image of the current frame calculated based on the real U map for the parallax images of the plurality of previous frames. As a result, highly accurate tracking may be performed.

In the above-described embodiments, since the parallax value may be treated to be equivalent to a distance value, a parallax image is illustrated as an example of a range image, but the present invention is not limited to these examples. For example, the range image may be generated by merging the range image of the millimeter wave radar or the laser radar may be merged with the parallax image generated by the stereo camera.

The system configuration in the above-described embodiments is merely an example, and various examples of the system configuration may also be applied according to intended use and purposes.

For example, each of the functional units of the process hardware unit 120 and the image analysis unit 102 may be implemented by hardware, or may be implemented by a CPU executing a program stored in a storage device. The above-described program may be distributed in a form of a computer-readable recording medium storing the program in files of an installable format or executable format. Or other examples of the recording medium may include a compact disc recordable (CD-R), a digital versatile disk (DVD), and a Blu-ray Disc. The above-described recording media that store the above-described programs such as a CD-ROM, and the HDs 504 that store these programs may be provided domestically or internationally as a program product.

Although the present invention has been described based on the embodiments, the present invention is not limited to the above-described embodiments, and various modifications may be made within the scope described in the claims.

According to the disclosed technology, it is possible to perform highly accurate tracking.

Further, the present invention is not limited to these embodiments and examples described above, but various variations and modifications may be made without departing from the scope of the present invention.

What is claimed is:

1. An image processing apparatus, comprising:
one or more processors; and
a memory, the memory storing instructions, which when executed by the one or more processors, cause the one or more processors to:
generate a distribution map, indicating a frequency distribution of horizontal distance values of a range image of a current frame, based on the range image having pixel values according to a distance to an object in a plurality of captured images;
detect the object based on the distribution data and with respect to the range image;
predict a predicted position of the object in the distribution map with respect to range images of a plurality of previous frames;
integrate a plurality of objects, detected by the one or more processors only when the plurality of objects overlap in the distribution map, based on the predicted position of the object to generate an integrated object; and
track the integrated object in distribution maps of range images of subsequent frames.

2. The image processing apparatus according to claim 1, wherein the instructions further cause the one or more processors to predict an integrated object predicted position of the integrated object in a distribution map of a range image of a next frame based on a position of the integrated object.

3. The image processing apparatus according to claim 1, wherein the instructions further cause the one or more processors to determine whether to integrate the plurality of objects based on a distance between the plurality of objects and relative velocities of the plurality of objects with respect to a reference moving body.

4. The image processing apparatus according to claim 1, wherein the instructions further cause the one or more processors to determine whether to integrate the plurality of objects based on whether each region, corresponding to each object of the plurality of objects, is included in a region of the integrated object at the predicted position, and based on respective distances in the distribution map between the predicted position and the plurality of objects.

5. The image processing apparatus according to claim 1, wherein the instructions further cause the one or more processors to track the integrated object based on a distance between the predicted position and a position of the object in the distribution map of the range image of the current frame, or based on a ratio at which a first region in the current frame with respect to the predicted position and a second region of the object in the current frame overlap.

6. The image processing apparatus according to claim 1, wherein the instructions further cause the one or more processors to:
predict a plurality of predicted positions based on a position of the object in the distribution map with respect to a previous range image and a relative velocity of the object with respect to a reference moving body; and
integrate the plurality of objects based on the plurality of predicted positions to track an integrated object in the subsequent frames.

7. The image processing apparatus according to claim 1, wherein the instructions further cause the one or more processors to track, upon a region of a background located a predetermined distance or more away from the plurality of objects being included within a region in which the plurality of objects are integrated, each of the plurality of objects in subsequent frames.

8. The image processing apparatus according to claim 1, wherein the instructions further cause the one or more processors to determine, upon tracking of an object integrating the plurality of objects, a distance to an object having a largest number of distance information values among the plurality of objects as a distance of the integrated object.

9. The image processing apparatus according to claim 1, wherein the instructions further cause the one or more processors to track, upon a degree of overlap between a current frame and a previous frame for a region of a plurality of objects being higher than a degree of overlap between the current frame and the previous frame for an integrated region including regions of a plurality of objects, each of the plurality of objects separately in subsequent frames.

10. The image processing apparatus according to claim 9, wherein the degree of overlap is based on at least one of an overlapping ratio and a distance between a plurality of regions.

11. The image processing apparatus according to claim 1, wherein the instructions further cause the one or more processors to:
integrate the plurality of objects according to a first integration condition, upon a velocity condition in which a reference moving body is moving at a velocity equal to or higher than a first threshold value and the object is moving at a velocity equal to or higher than a second threshold value not being satisfied; and
integrate the plurality of objects according to a second integration condition that is easier to integrate than the first integration condition, upon the velocity condition being satisfied.

12. An imaging system, comprising:
a plurality of imaging devices, each imaging device of the plurality of imaging devices being configured to capture an image;
one or more processors; and
a memory, the memory storing instructions, which when executed by the one or more processors, cause the one or more processors to:
generate a range image, a current frame, having pixel values according to distance to an object in a plurality of captured images captured by the plurality of imaging devices;
generate a distribution map, indicating a frequency distribution of horizontal distance values of the range image, based on the range image;
detect the object based on the distribution map and with respect to the range image;
predict a predicted position of the object in the distribution map with respect to range images of a plurality of previous frames;
integrate a plurality of objects, detected by the one or more processors only when the plurality of objects overlap in the distribution map, based on the predicted position of the object to generate an integrated object; and
track the integrated object in distribution maps of range images of subsequent frames.

13. A moving body device control system, comprising:
a plurality of imaging devices mounted on a moving body, each imaging device of the plurality of imaging devices being configured to capture an image in front of the moving body; and the image processing apparatus according to claim 1, wherein
the instructions further cause the one or more processors to control the moving body based on a tracking result of the tracking the integrated object.

14. A moving body system, comprising:
the moving body; and
the moving body device control system according to claim 13, wherein
the moving body is controlled by the controlling of the moving body device control system.

15. A non-transitory computer readable medium storing a program having instructions which, when executed by a computer, cause the computer to:
generate a distribution map, indicating a frequency distribution of horizontal distance values of a range image of a current frame, based on the range image having pixel values according to a distance to an object in a plurality of captured images;
detect the object based on the distribution map and with respect to the range image;
predict a predicted position of the object in the distribution map with respect to range images of a plurality of previous frames;
integrate a plurality of objects, detected one or more processors only when the plurality of objects overlap in the distribution map, based on the predicted position of the object to generate an integrated object; and
track the integrated object in distribution maps of range images of subsequent frames.

* * * * *